US008346995B2

(12) United States Patent
Green et al.

(10) Patent No.: US 8,346,995 B2
(45) Date of Patent: Jan. 1, 2013

(54) BALANCING USAGE OF HARDWARE DEVICES AMONG CLIENTS

(75) Inventors: Dustin L. Green, Redmond, WA (US); Yau Ning Chin, Seattle, WA (US); Bruce L. Worthington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 168 days.

(21) Appl. No.: 12/242,624

(22) Filed: Sep. 30, 2008

(65) Prior Publication Data

US 2010/0082851 A1    Apr. 1, 2010

(51) Int. Cl.
    G06F 3/00 (2006.01)
    G06F 13/28 (2006.01)
    G06F 5/00 (2006.01)
(52) U.S. Cl. ............ 710/29; 710/6; 710/25; 710/36; 710/40; 710/58
(58) Field of Classification Search .......... 710/29
    See application file for complete search history.

(56) References Cited

U.S. PATENT DOCUMENTS

| | | | |
|---|---|---|---|
| 5,175,679 A | 12/1992 | Allen et al. | |
| 5,179,702 A * | 1/1993 | Spix et al. ............... | 718/102 |
| 5,313,584 A | 5/1994 | Tickner et al. | |
| 5,467,268 A * | 11/1995 | Sisley et al. ............ | 705/9 |
| 5,535,418 A | 7/1996 | Suzuki | |
| 5,655,120 A | 8/1997 | Witte et al. | |
| 5,948,081 A | 9/1999 | Foster | |
| 5,978,560 A | 11/1999 | Tan et al. | |
| 6,032,200 A | 2/2000 | Lin | |
| 6,272,565 B1 | 8/2001 | Lamberts | |
| 6,292,856 B1 | 9/2001 | Marcotte | |
| 6,353,844 B1 | 3/2002 | Bitar et al. | |
| 6,356,917 B1 | 3/2002 | Dempsey et al. | |
| 6,557,055 B1 | 4/2003 | Wiese | |
| 6,751,684 B2 | 6/2004 | Owen et al. | |
| 6,877,049 B1 | 4/2005 | Myers | |
| 6,930,795 B1 | 8/2005 | Motamed et al. | |
| 6,971,097 B1 | 11/2005 | Wallman | |
| 7,080,146 B2 | 7/2006 | Bradford et al. | |
| 7,162,550 B2 | 1/2007 | Douglas | |
| 7,165,252 B1 * | 1/2007 | Xu ............................. | 718/102 |
| 7,167,916 B2 * | 1/2007 | Willen et al. ............ | 709/226 |
| 7,197,749 B2 | 3/2007 | Thornton et al. | |
| 7,225,293 B2 | 5/2007 | Lamberts | |
| 7,353,514 B1 | 4/2008 | Camp et al. | |
| 7,441,244 B2 * | 10/2008 | Longobardi .............. | 718/104 |
| 7,444,638 B1 * | 10/2008 | Xu ............................. | 718/104 |
| 7,698,530 B2 * | 4/2010 | Flemming et al. ........ | 711/173 |
| 7,707,578 B1 * | 4/2010 | Zedlewski et al. ........ | 718/102 |
| 2003/0149717 A1 | 8/2003 | Heinzman | |
| 2004/0143687 A1 | 7/2004 | Cox | |
| 2004/0237087 A1 | 11/2004 | Ye et al. | |

(Continued)

OTHER PUBLICATIONS

Nutt, Centralized and Distributed Operating Systems, 1992, Prentice-Hall, pp. 147-149, 154-157.*

(Continued)

*Primary Examiner* — Kris Rhu
(74) *Attorney, Agent, or Firm* — Woodcock Washburn LLP

(57) ABSTRACT

Techniques are disclosed for managing the flow of IO jobs from a client to a hardware device such that resource starvation is reduced without significantly impacting throughput. Each flow can be assigned an amount of time that a hardware device can deplete completing IO jobs from the client. When the allocated amount of time is used IO jobs associated with the client can be stored in a queue until the client obtains more time.

18 Claims, 15 Drawing Sheets

U.S. PATENT DOCUMENTS

| | | | |
|---|---|---|---|
| 2005/0015767 A1* | 1/2005 | Nash et al. | 718/102 |
| 2005/0060704 A1 | 3/2005 | Bulson et al. | |
| 2005/0144332 A1 | 6/2005 | Nellitheertha | |
| 2006/0037018 A1 | 2/2006 | Fang et al. | |
| 2006/0045139 A1 | 3/2006 | Black et al. | |
| 2006/0182030 A1 | 8/2006 | Harris et al. | |
| 2006/0187970 A1 | 8/2006 | Lee et al. | |
| 2006/0242648 A1 | 10/2006 | Guccione et al. | |
| 2007/0016907 A1* | 1/2007 | Benedetti et al. | 718/104 |
| 2007/0206645 A1 | 9/2007 | Sundqvist et al. | |
| 2007/0220516 A1 | 9/2007 | Ishiguro et al. | |
| 2007/0288224 A1 | 12/2007 | Sundarrajan et al. | |
| 2008/0016508 A1 | 1/2008 | Goto et al. | |
| 2008/0022280 A1* | 1/2008 | Cherkasova et al. | 718/102 |
| 2008/0046609 A1 | 2/2008 | Shum et al. | |
| 2008/0052712 A1 | 2/2008 | Gustafson et al. | |
| 2008/0066070 A1 | 3/2008 | Markov | |
| 2008/0086733 A1 | 4/2008 | Jensen et al. | |
| 2008/0155087 A1 | 6/2008 | Blouin et al. | |
| 2008/0172441 A1 | 7/2008 | Speicher et al. | |
| 2008/0209425 A1* | 8/2008 | Ferris | 718/102 |
| 2009/0276781 A1* | 11/2009 | Chan et al. | 718/103 |

OTHER PUBLICATIONS

"Print Spooler and Print Spooling Software," http://www.plustechnologies.com/plustech/print-spooler.asp, 2004, 1708-1712.

"A Modification to RED AQM for CIOQ Switches," http://ieeexplore.ieee.org/ie15/9481/30079/01378273.pdf?isnumber=30079&arnumber=1378273, downloaded 2008, 3 pages.

Coleman, "Batch Tuning: Do More in Less Time", Jun. 24, 2008, 3 pages.

Khanna et al., "A Hypergraph Partitioning Based Approach for Scheduling of Tasks With Batch-Shared I/O", IEEE International Symposium on Cluster Computing and the Grid, 2005, CCGrid 2005, May 9-12, 2005, 2, 1-20.

Lee et al., "Implications of I/O for Gang Scheduled Workloads", IPPS '97 Proceedings of the Job Scheduling Strategies for Parallel Processing, 1997, 1-12.

Leung, "Scalable Security for High Performance, Petascale Storage", Storage Systems Research Center Technical Report UCSC-SSRC-07-07, Jun. 2007, 23 pages.

Schmookler et al., "A Low-power, High-speed Implementation of a PowerPC™ Microprocessor Vector Extension", Proceedings 14th IEEE Symposium on Computer Arithmetic, Apr. 14-16, 1999, 8 pages.

Sugerman et al., "Virtualizing I/O Devices on VMware Workstation's Hosted Virtual Machine Monitor", Proceedings of the General Track: 2002 USENIX Annual Technical Conference, Jan. 3, 2002, 14 pages.

* cited by examiner

BALANCING USAGE OF HARDWARE DEVICES AMONG CLIENTS

CROSS REFERENCE TO RELATED APPLICATIONS

This application is related to U.S. patent application Ser. No. 12/242,615 entitled "TEMPORAL BATCHING OF I/O JOBS" filed Sep. 30, 2008 and incorporated by reference in its entirety; and U.S. application Ser. No. 12/242,621 "HARDWARE THROUGHPUT SATURATION DETECTION" filed Sep. 30, 2008 and incorporated by reference in its entirety.

BACKGROUND

Virtualization provides techniques for consolidating physical machines. That is, multiple virtual machines can be executed by a single physical machine. When servers are consolidated, a problem exists in how the virtual machines access the physical hardware. For example, if 5 virtual machines are effectuated by software instructions each one of them may attempt to access a physical hardware device such as a storage device, network adaptor, etc. The hardware device many not be able to efficiently support this many requestors and one or more of the virtual machines may experience resource starvation, e.g., the instance where the virtual machine is denied resources and its requests experience high latency. This is due to the fact that hardware devices are not configured to process information that identifies which IO jobs are from which virtual machine. The hardware device of course does not select IO jobs to complete in an arbitrary order, it selects IO jobs to maximize throughput and because of this certain IO jobs may sit in the device's buffer for an unacceptable length of time. For example, a driver for a hardware device such as a storage device may complete 200 IO jobs from a first virtual machine before completing 8 IO jobs from a second virtual machine because completing the 200 IO jobs may allow the hardware device to achieve higher throughput than if it completed the 8 IO jobs. One solution to eliminate resource starvation would be to limit the IO jobs that the driver can select buy sending IO jobs to the hardware one at a time. This technique implemented naively would severely impact throughput. That is, by hand picking each IO job the hardware device would not be able to reach its throughput potential. Thus, techniques for balancing throughput vs. resource starvation are desirable.

SUMMARY

An example embodiment of the present disclosure describes a method. In this example, the method includes, but is not limited to receiving an IO job associated with a client; determining that a hardware device has spent an estimated amount of time completing jobs associated with the client that exceeds an amount of time that was allocated to complete IO jobs from the client; and storing the IO job in a queue. In addition to the foregoing, other aspects are described in the claims, drawings, and text forming a part of the present disclosure.

An example embodiment of the present disclosure describes a method. In this example, the method includes, but is not limited to storing a value indicative of an amount of time a hardware device can spend completing IO jobs from the client; receiving IO jobs associated with the client; estimating an amount of time the hardware device will need to complete the IO jobs; and revising the value based on the estimated amount of time required to complete the IO jobs. In addition to the foregoing, other aspects are described in the claims, drawings, and text forming a part of the present disclosure.

An example embodiment of the present disclosure describes a method. In this example, the method includes, but is not limited to storing a plurality of negative time values, each negative time value associated with a client, each negative time value being indicative of an estimated amount of time that a hardware device spent completing IO jobs associated with the client; storing a value indicative of an issue line, the value indicative of the issue line separating positive time values from the negative values, the positive time values associated with clients that are eligible to send IO jobs to the hardware device; and receiving a job completion signal from the hardware device. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
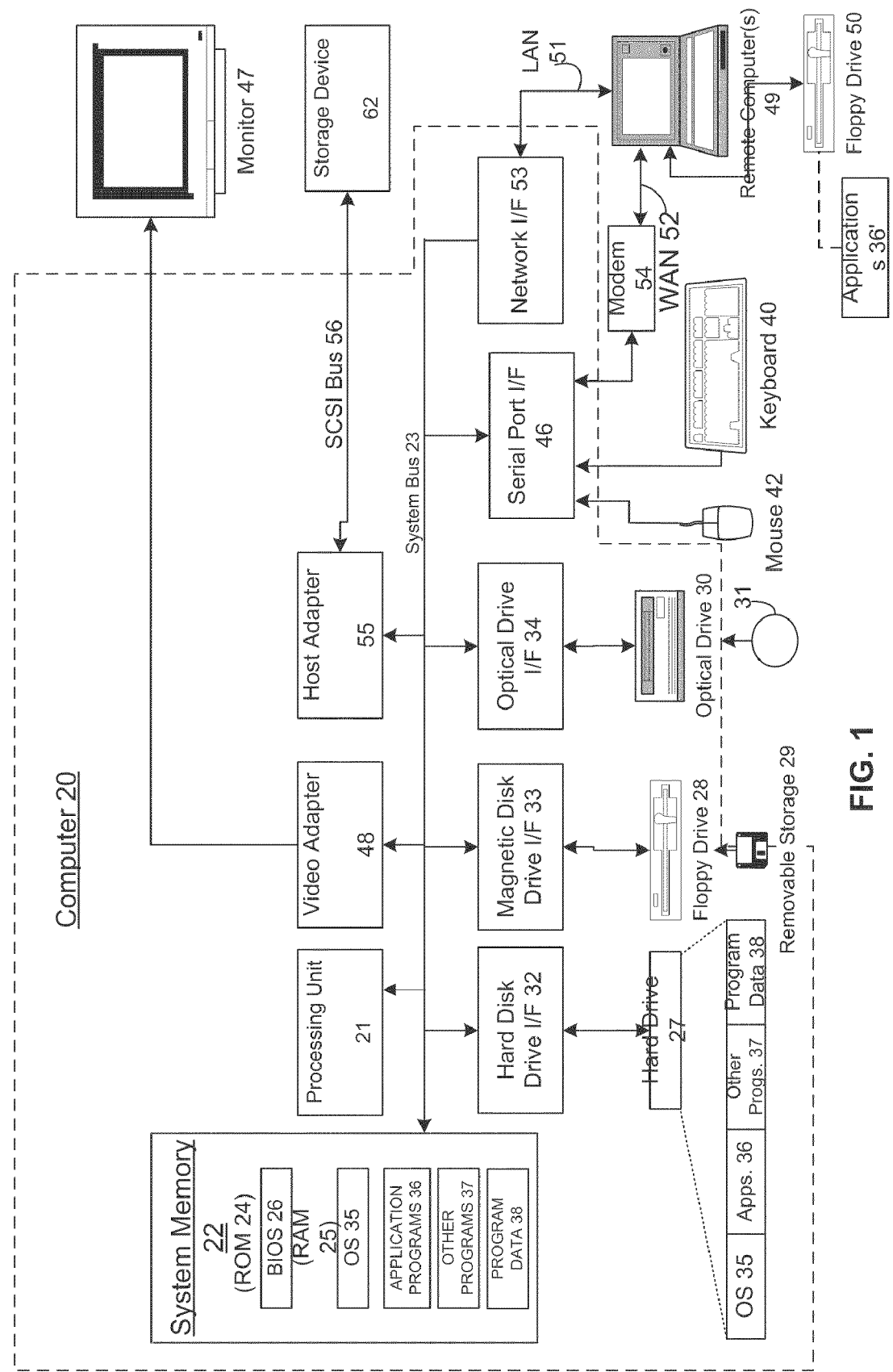
FIG. 1 depicts an example computer system wherein aspects of the present disclosure can be implemented.

Embodiments of the present disclosure may execute on one or more computers. FIG. 1 and the following discussion is intended to provide a brief general description of a suitable computing environment in which the disclosure may be implemented. One skilled in the art can appreciate that some or all of the components of the computer system of FIG. 1 can be used to effectuate computer 200 of FIG. 2 and the computer 200 of FIG. 3.

The term circuitry used through the disclosure can include specialized hardware components such as hardware interrupt controllers, hard drives, network adaptors, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
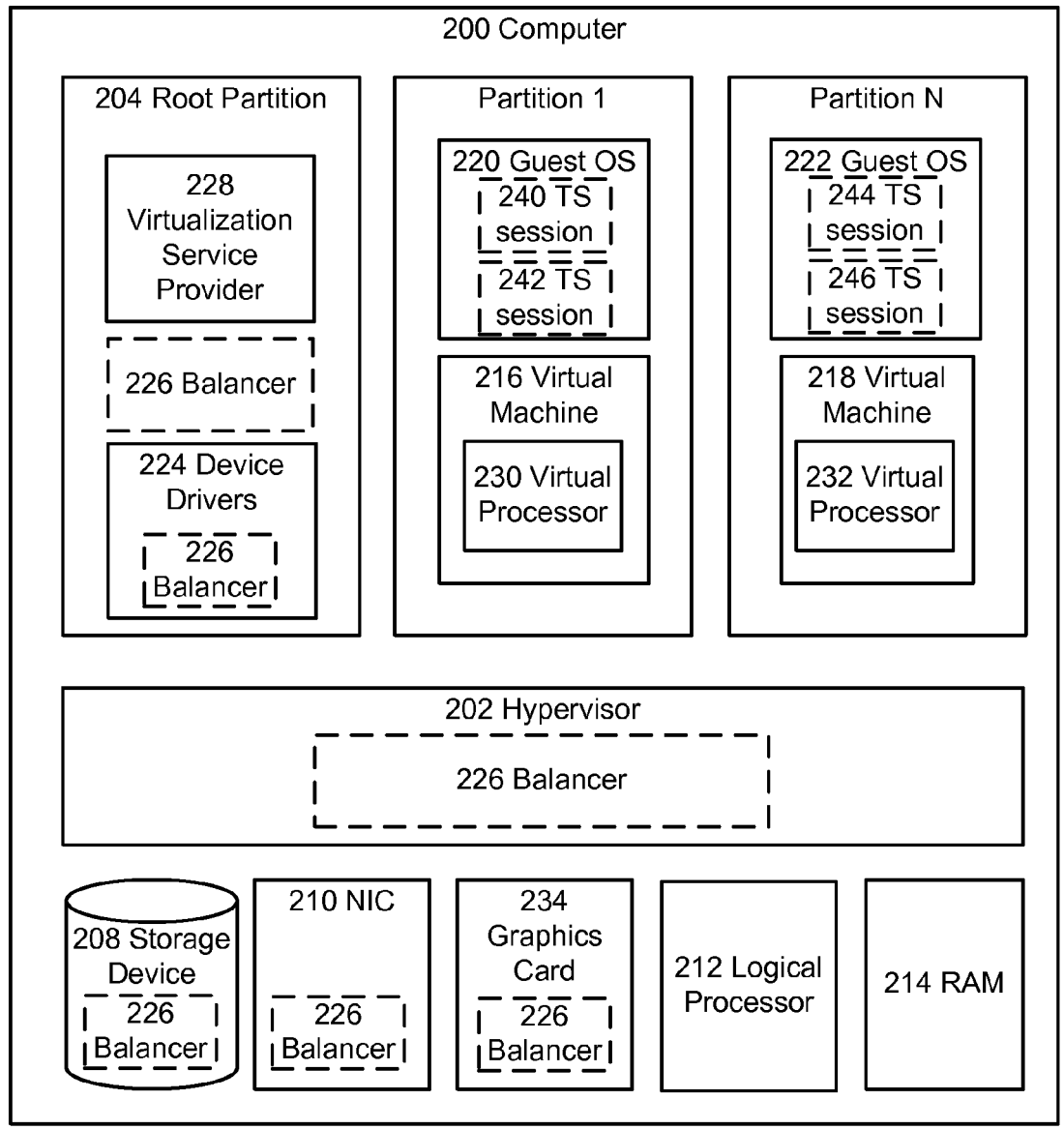
FIG. 2 depicts an operational environment for practicing aspects of the present disclosure.
Figure 3:
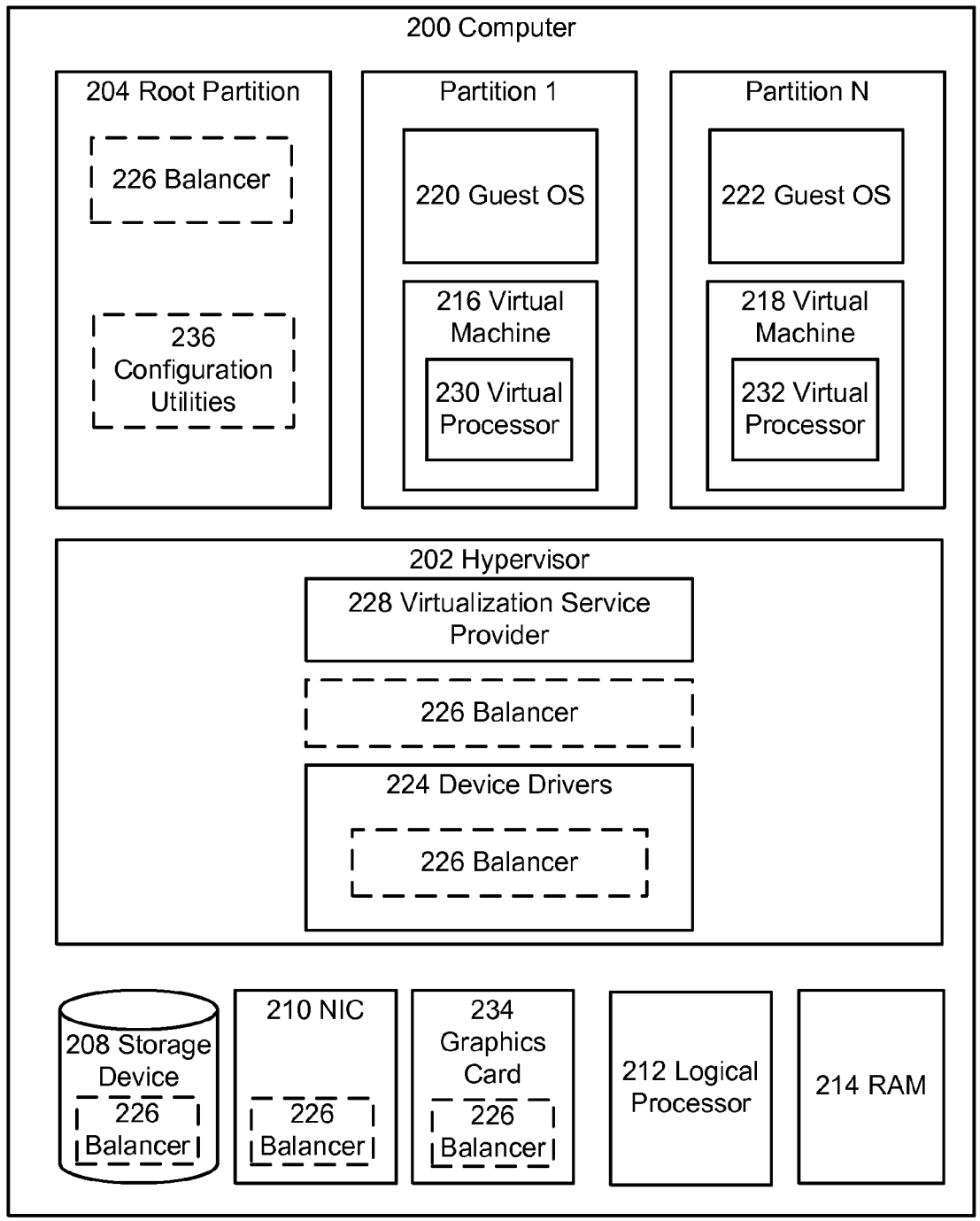
FIG. 3 depicts an operational environment for practicing aspects of the present disclosure.

Referring now to FIGS. 2 and 3, they depict high level overviews of computer systems including circuitry for virtualizing resources that can be used in aspects of the present disclosure. As shown by the figure, computer 200 can include physical hardware devices such as storage device 208, e.g., a hard drive, a network interface controller (NIC) 210, e.g., a network interface card or Ethernet adapter, a graphics card 234, at least one logical processor 212 and random access memory (RAM) 214. One skilled in the art can appreciate that while one logical processor is illustrated in other embodiments computer 200 may have multiple logical processors, e.g., multiple execution cores and/or multiple processors. In these embodiments multiple threads can be executed at the same time, e.g., one or more threads per logical processor. Continuing with the description of FIG. 2, depicted is a hypervisor 202 that may also be referred to as a virtual machine monitor. The hypervisor 202 in the depicted embodiment includes executable instructions for controlling and arbitrating access to the hardware of computer 200. The hypervisor 202 can generate execution environments called partitions such as partition 1 and partition N (where N is an integer greater than 1.) In embodiments of the present disclosure a partition can be considered the basic unit of isolation supported by the hypervisor 202, that is, each partition can be mapped to a set of hardware resources, e.g., memory, devices, logical processor cycles, etc., that is under control of the hypervisor 202. In an embodiment the hypervisor 202 can be a stand alone software produce, a part of an operating system, embedded within firmware of the motherboard or a portion of the hypervisor 202 can be effectuated by specialized integrated circuits.

Continuing with the description of FIG. 2, the computer 200 can include a root partition 204 that may include a virtualization service provider 228 (VSP.) In this example architecture the root partition 204 can access the underlying hardware via device drivers 224. The VSP 228 in this example can effectuate interfaces in partitions know as children, and these children can be considered virtual machines. The virtualization service provider 228 effectuates virtual machines 216 and 218 by instantiating different classes of devices as software and exposes interfaces to the devices within the partitions. Each virtual machine can include a virtual processor such as virtual processors 230 and 232 that guest operating systems 220 and 222 can manage and schedule threads to execute thereon. Generally, the virtual processors 230 and 232 are executable instructions and associated state information that provides a representation of a physical processor with a specific architecture. For example, one virtual machine may have a virtual processor having characteristics of an Intel 80X86 processor, whereas another virtual processor may have the characteristics of a Power PC processor. The virtual processors in this example can be mapped to logical cores of the computer system such that the instructions that effectuate the virtual processors will be backed by logical processors. Thus, in these example embodiments multiple virtual processors can be simultaneously executing while, for example, another logical processor is executing hypervisor instructions.

Continuing with the description of FIG. 2, it additionally illustrates a balancer 226. The balancer 226 can include computer executable instructions that can balance hardware usage among a plurality of clients using a variety of techniques to reduce resource starvation experienced by a client and maximize throughput. As is illustrated by the dashed lines of FIG. 2, the balancer 226 can be loaded within the computer executable code that effectuates the hypervisor 202 or in other embodiments the balancer 226 can be part of the code that effectuates the root partition 204. The balancer 226 can in other embodiments be a stand alone piece of code that is not part of another piece of code, e.g., the balancer 226 does not have to be part of the hypervisor 202 or the root partition 204 and the disclosure is not limited to the depicted embodiments. The balancer 226 can additionally be part of a driver for a hardware device. In this example driver developers can augment the existing algorithms used to maximize throughput with techniques described herein. As shown by the figure, the balancer 226 can additionally be embedded within the physical hardware devices in the form of specialized circuits or firmware.

Referring now to FIG. 3, it illustrates an alternative architecture that can be used to practice embodiments of the present disclosure. FIG. 3 depicts similar components to those of FIG. 2, however in this example embodiment the hypervisor 202 can include the virtualization service provider 228 and device drivers 224, and the root 204 can contain configuration utilities 236. In this architecture the hypervisor 202 can perform the same or similar functions as the hypervisor 202 of FIG. 2. The hypervisor 202 of FIG. 3 can be a stand alone software produce, a part of an operating system, embedded within firmware of the motherboard or a portion of the hypervisor 202 can be effectuated by specialized integrated circuits. In this implementation the hypervisor 202 can be thought of as instructions that execute directly on the bare metal of the hardware. In this example the root partition 204 may have instructions that can be used to configure the hypervisor 204 however hardware access requests may be handled by the hypervisor 202 instead of being passed to the root partition 204. Similar to that above, the balancer 226 can be included within the instructions that effectuate the hypervisor 202, the instructions that effectuate the root partition 204, any other place within the computer system 200, or by hardware.

In embodiments of the present disclosure the balancer 226 is operable to manage the flow of IO jobs from a client to a hardware device such that resource starvation is reduced and high throughput is obtained. Generally, and throughout the disclosure, concepts will be described using units of time instead of byte count or IO job count for ease of explanation and the disclosure is not limited to implementations where calculations are based in and on time. That is, in other example implementations the disclosed algorithms can be modified to be based on IO job count or byte count since there are relationships between IO jobs, bytes in IO jobs, and time that will be described in more detail below and in the related applications.

The balancer 226 can calculate the throughput of the hardware device in order to attempt to maximize the hardware device's throughput. Hardware devices do not generally provide any meaningful information about throughput, thus alternative techniques need to be used. In example embodiments the throughput of the hardware device can be obtained using the amount of time required to complete IO jobs pending in the hardware device (the time cost of pending IO jobs.) For example, time cost represents an estimated amount of time that the hardware device will require in order to complete an IO job. Or put another way, time cost represents the amount of 'dedicated' time that the hardware device will take to execute a given IO job and return a completion signal to the balancer 226. If a hardware device can only execute one IO job at a time, then the IO time cost of an IO job is just the time duration from when the IO job is issued to the hardware until the hardware completes the IO job. In this example the entire time duration is dedicated to the one IO job because the hardware can't make progress on more than one IO job at a time. In another example a storage device may have 16 separate drives and can execute 16 IO jobs at a time. In this example the duration of time from when the IO job is issued until it completes is not equivalent to its IO time cost. In this example the IO time cost may be as low as $\frac{1}{16}^{th}$ of the duration.

The throughput of a hardware device can be calculated from the time cost for the IO jobs that are pending in the hardware device. Each IO job that is pending in the hardware device, e.g., in-flight, can have a time cost and the total time cost for the pending IO jobs can represent how much 'work' the hardware device has. Generally, the time cost for an IO job can be estimated based on the characteristics of the IO job itself. Each characteristic can be associated with a cost factor, e.g., a scalar that represents how expensive the characteristic is. The balancer 226 can multiply each characteristic by its corresponding cost factor and the total number can be the time cost for the IO job. In other example embodiments techniques described in U.S. application Ser. No. 12/242,621 entitled "HARDWARE THROUGHPUT SATURATION DETECTION" can be used to estimate an IO job's time cost.

From the estimated total amount of 'work' that the hardware device has pending the maximum throughput of the hardware device can be obtained using techniques described in U.S. patent application Ser. No. 12/242,615 entitled "TEMPORAL BATCHING OF I/O JOBS" and/or U.S. application Ser. No. 12/242,621 entitled "HARDWARE THROUGHPUT SATURATION DETECTION." Generally, as the time cost of the pending IO jobs increases so does achieved throughput. This is because hardware devices such as storage devices complete IO jobs in accordance with internal algorithms (performed either in hardware, firmware, or in the driver) that attempt to select IO jobs to execute so that the currently pending IO jobs can be completed within the shortest period of time, among other selection criteria. This is most efficiently accomplished when the hardware device has a plethora of IO jobs to select from. Generally, as time cost of pending IO jobs increases so does throughput up to a saturation point, or a point where the addition time cost of an additional IO job provides no significant additional hardware throughput. In an embodiment the saturation point can be used as a target latency value, or a time cost of pending IO jobs that the balancer 226 wants to keep the hardware device above in order to achieve high throughput.

In order to achieve high throughput the balancer 226 can keep the hardware saturated with IO jobs and in order to reduce starvation the balancer 226 can use techniques described herein to select which IO jobs to send to the hardware. For example, IO jobs can be sent to the hardware device based on the amount of time a client used the hardware device. As the balancer 226 sends more IO jobs associated with one client to the hardware device the client's allocated amount of time can be used up. When a client uses up their allotted time client IO jobs can be stored in a queue and other IO jobs from other clients can be sent to the hardware device. Generally speaking, the balancer 226 can attempt to keep the hardware device saturated with IO jobs from one client, and then keep the hardware device saturated with IO jobs from another client. In this implementation, throughput is high, and resource starvation experienced by clients is relatively low compared to the situation where one client is dominating the hardware device.

In one example implementation 'flows' are used by the balancer 226 to keep track of which client has overused the hardware device and which client can use the hardware device. For example, a flow can represent the IO jobs being issued from a specific client to a specific hardware device. Thus, if there are two hardware devices a client could have two flows, e.g., one for each hardware device. In an implementation each flow can be a value that represents the total amount of time the client can use or has overused the hardware device. Conceptually speaking a positive value can represent time a client can use whereas a negative value can represent how much the client overused a hardware device. While the terms 'positive' and 'negative' are used throughout the disclosure one skilled in the art can appreciate that this is to provide a simple way to illustrate concepts and that the terms 'positive' and 'negative' are not limited to their literal meaning. That is, in an embodiment a 'negative' value could be any information that can be interpreted by a computer as meaning that a client has overused the hardware whereas a positive number can be any information that can be interpreted by a computer as meaning the client has time available on the hardware device. One of skill in the art can appreciate that in embodiments where the balancer 226 is configured to provide short term balance the flows may not go negative. That is, a client may not overuse a hardware device. In certain embodiments however the cost of switching flows may be higher than the cost of allowing the client to overuse the hardware device, thus in these and other embodiments the balancer 226 may be configured to allow a client to overuse the hardware device in order to keep throughput high.

Figure 4:
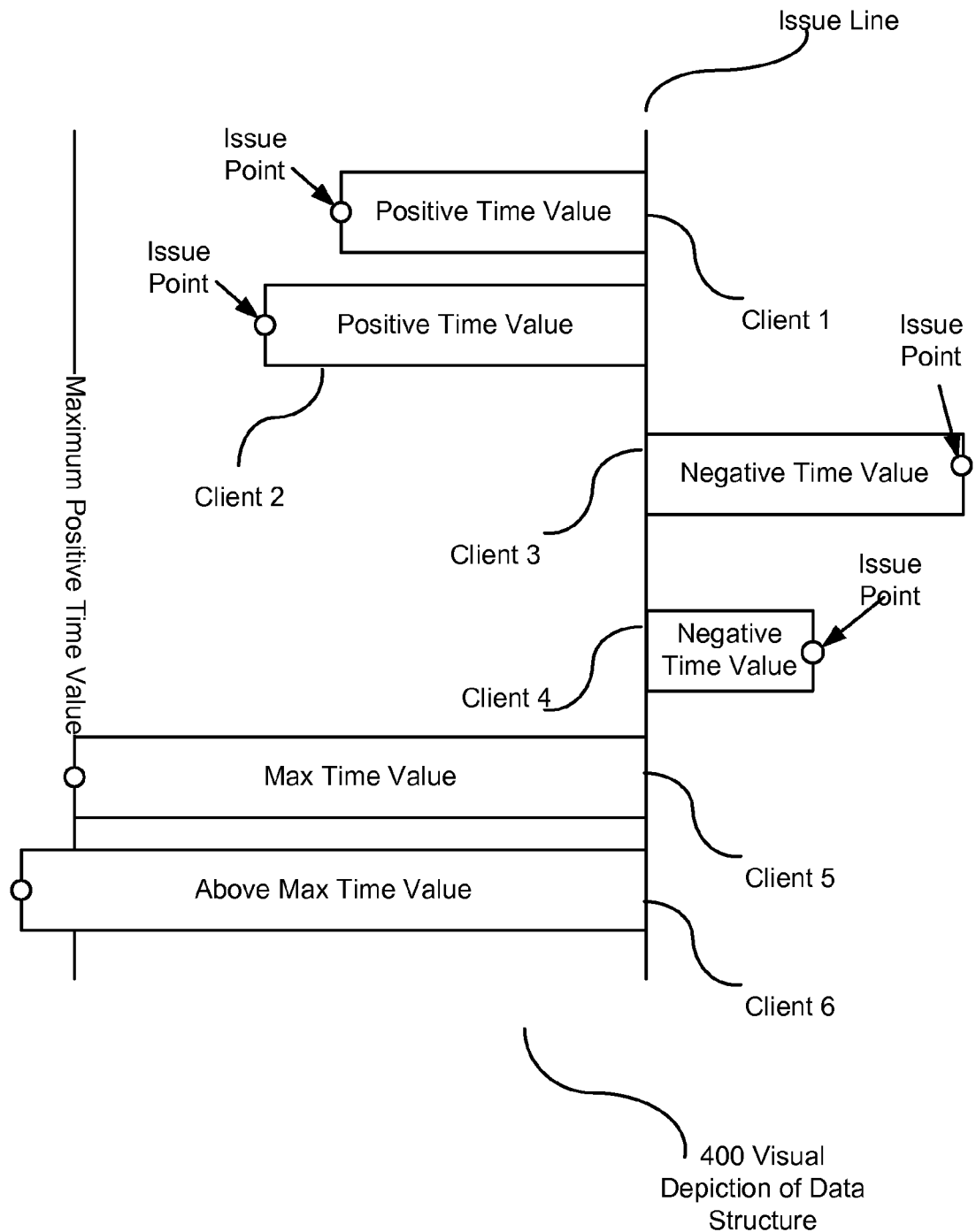
FIG. 4 provides an example that can be used to illustrate the concept of 'flows.'

FIG. 4 provides an example that can be used to illustrate the concept of 'flows.' FIG. 4 generally provides a pictorial representation of a data structure 400 that the balancer 226 can maintain in order to balance hardware usage among clients. As was stated above, in an embodiment each client using a hardware device can have an associated flow and the flow can be positive or negative (for example the flow for client 1 is positive whereas the flow for client 4 is negative.) In this example a positive value can represent an amount of time a hardware device can spend completing IO jobs from its associated client before subsequent jobs will be queued. A negative number can represent the amount of time that the client overused the hardware device. The issue point in this implementation can be a value that indicates the degree to which a flow has used too much time of the hardware device relative to other flows. In a specific implementation a flow's value can be represented as the difference between two numbers stored in RAM, e.g., a number indicative of the issue line and a number indicative of the issue point for the flow. In an example the difference could be positive, that is the issue line could be more positive than the issue point. In this example the issue line could be 20 ms, the issue point for client flow 1 could be 10 ms and the difference can be 10 ms (which could be indicative of a positive flow.) On the other hand the issue point for client 3 flow could be 30 ms and the difference between the issue line and the issue point could be −10 (which indicates that the flow is negative.)

The following are a series of flowcharts depicting implementations of processes. For ease of understanding, the flowcharts are organized such that the initial flowcharts present implementations via an overall "big picture" viewpoint and subsequent flowcharts provide further additions and/or details. Those having skill in the art will appreciate that the style of presentation utilized herein generally allows for a rapid and easy understanding of the various operational procedures that form a part of the present disclosure.

Figure 5:
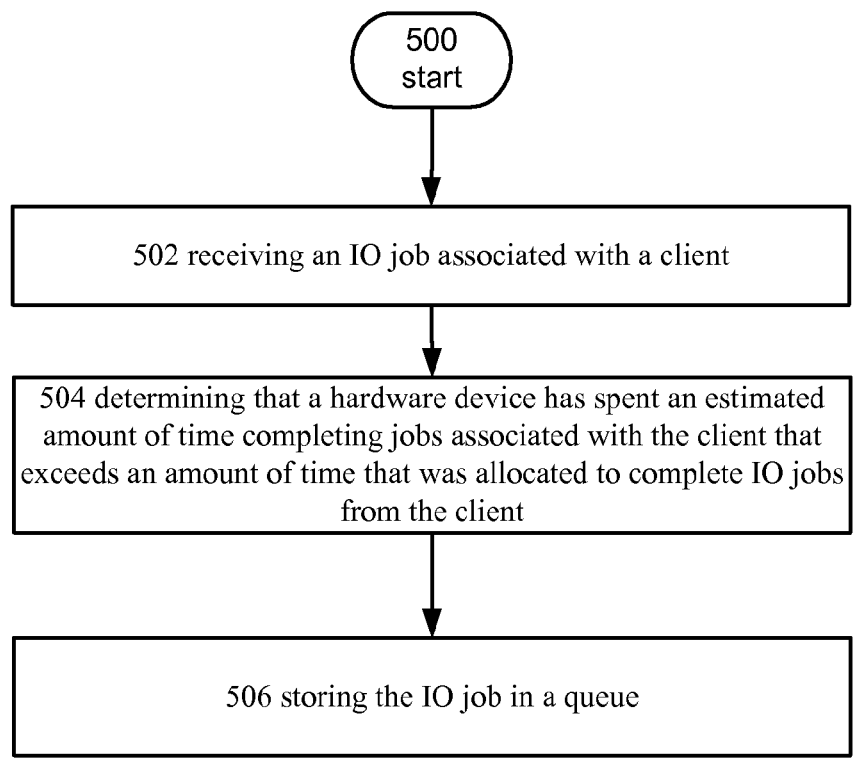
FIG. 5 illustrates an operational procedure for balancing usage of a hardware device.

Referring now to FIG. 5, it illustrates an operational procedure for balancing usage of a hardware device including the operational procedure 500-506. Operation 500 begins the operational procedure and operation 502 shows receiving an IO job associated with a client. For example, and referring to FIG. 2 and/or FIG. 3, the balancer 226 can receive an IO job from a client such as, for example, virtual machine 216. In an embodiment the processor 212 can execute instructions indicative of the root partition 204 and the balancer 226. The balancer 226 can have a memory location that is shared with the virtual machine 216, e.g., a ring buffer or a self overwriting memory location. The IO job in this example can be a job for a storage device 208, e.g., a read, write, a flush, etc., a job for a NIC 210, e.g., a request to send one or more packets of information, or a draw command for a graphics card. In this example the balancer 226 can access the shared memory location and receive information that identifies the request and, for example, a pointer to the data. In an embodiment where the balancer 226 is embedded within the hardware device the IO request could be received from the device driver 224. In this example, information that identifies which client the request is associated with can be sent to the hardware device. In yet another implementation the balancer 226 can be effectuated by instructions that are a part of the hypervisor 202. In this example the client can place the request in the shared memory location and the hypervisor 202 can be executed and the job can be passed to the balancer 226.

Continuing with the description of FIG. 5, operation 504 depicts determining that a hardware device has spent an estimated amount of time completing jobs associated with the client that exceeds an amount of time that was allocated to complete IO jobs from the client. For example, in embodiments of the present disclosure the balancer 226 can be configured to regulate how much time the hardware device can spend processing IO jobs from a given client by determining whether the client has already used an amount of time that it was allotted, e.g., whether the client has a positive flow. In this example as an IO job is received from the client the balancer 226 can estimate how long it will take the hardware device to complete the job based on factors such as the number of bytes in the request, the type of request, e.g., read or write, overhead associated with processing any request, whether the request involves a flow switch or is in non-sequential order (in the storage device example), etc., and a determination can be made as to whether the client has any time available on the hardware device. In the same, and other embodiments the balancer 226 can use techniques described in U.S. application Ser. No. 12/242,621 entitled "HARDWARE THROUGHPUT SATURATION DETECTION."

In a specific example of operation 502 processor 212 can execute the instructions indicative of the balancer 226 and each client can be assigned a value indicative of the amount of time that the hardware device can spend completing its IO jobs, for example 5 ms. A specific client in this example may send an amount of IO jobs to the balancer 226 and the balancer 226 may estimate that it will take 20 ms for the hardware device to complete the IO jobs; and send all of the jobs to the hardware device. In this example information that identifies that the client is estimated to have gone over it's allotted time, e.g., by 15 ms, can be stored in memory. Subsequently the client may send another set of IO jobs to the balancer 226 and the balancer 226 can determine that the client has previously gone over an amount of time that was allocated to service IO jobs from the client.

Continuing with the description of FIG. 5, operation 506 shows storing the IO job in a queue. For example, and continuing with the previous example, once the determination is made that the client has used up its allotted amount of time the request can be stored in a queue along with, for example, information that identifies the client associated with the request and information that identifies the estimated amount of time it will take for the hardware device to complete the request. In an example implementation, one in which the balancer 226 is not part of the hardware device, each hardware device can include a buffer where pending IO jobs are stored and the hardware device will select jobs to complete from a buffer based on a hardware algorithm that maximizes throughput. The balancer 226 can be used in this embodiment to determine which jobs are placed in the hardware device's buffer. In a hardware implementation, the hardware device can include information that identifies the source of the IO job, e.g., which client the job came from. In this example the balancer 226 can work in conjunction with the internal algorithms to force the hardware device to switch from jobs that maximize throughput to jobs that are potentially less efficient but which represent a better balance among clients.

In either implementation by storing the IO job in a queue the end result is that the hardware device will complete other jobs it has in its buffer. This emergent behavior is desirable because a hardware device may have a bias towards a stream of IO jobs from one client because the stream is more efficient for the hardware device to complete. As the hardware device spends more and more of its processing time completing jobs from a given client, the balancer 226 will send fewer and fewer jobs from that client to the hardware device's buffer and instead store them in the balancer queue. Eventually the hardware device may not have any jobs from the client and the hardware device will be forced to complete other jobs for other clients. This emergent behavior is desirable in embodiments that include clients such as virtual machines and/or terminal servers because if the hardware device has a bias towards a particular virtual machine the other virtual machines(s) will not have their jobs completed within a reasonable amount of time.

Figure 6:
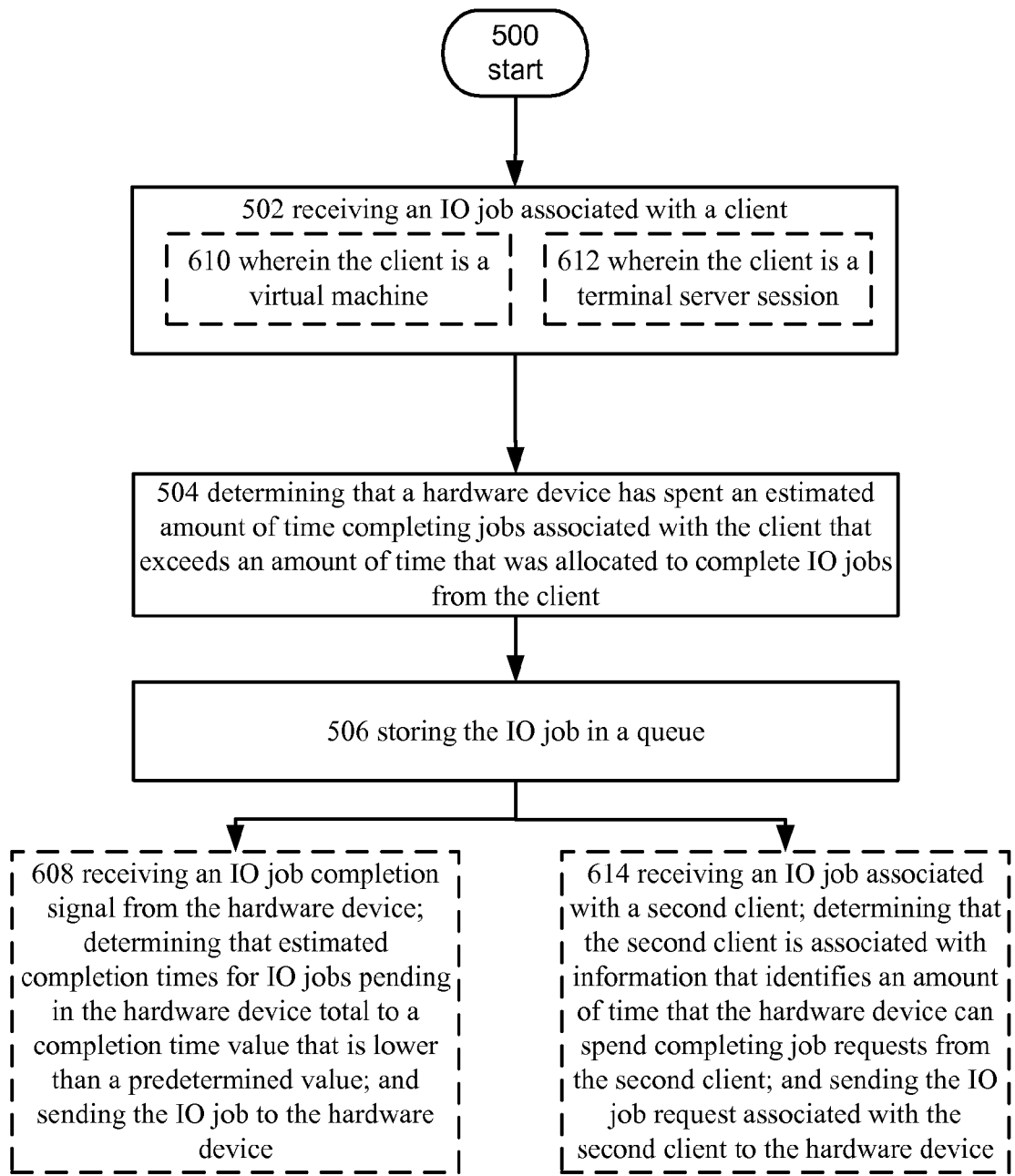
FIG. 6 depicts an alternative embodiment of the operational procedure 500 of FIG. 5.

Referring now to FIG. 6, it depicts an alternative embodiment of the operational procedure 500 of FIG. 5 including the additional operations 608, 610, 612, and 614. Referring now to operation 608 it illustrates receiving an IO job completion signal from the hardware device; determining that estimated completion times for IO jobs pending in the hardware device total to a completion time value that is lower than a predetermined value; and sending the IO job to the hardware device. For example, in an embodiment of the present disclosure the IO job or jobs from the client can be stored in the balancer queue. In this example embodiment an IO job completion signal can be received from the hardware device, e.g., a signal that indicates that jobs that were previously sent to the hardware device at an earlier time are finished, and the balancer 226 can be run, e.g., the processor 212 can execute the instructions indicative of the balancer 226. The balancer 226 in this example can determine the estimated amount of time that it will take for the hardware device to complete the IO jobs that are currently 'in flight' from the perspective of the balancer 226, e.g., the jobs are 'in flight' because they have been sent to the hardware device and completion signals have not been received for the IO jobs, and determine whether the total is less than a predetermined value. For example, in an embodiment the predetermined value can be a value set by an administrator, or as is described U.S. patent application Ser. No. 12/242,615 entitled "TEMPORAL BATCHING OF I/O JOBS" the predetermined value can be the saturation point of a hardware device. In this example embodiment once the balancer 226 determines that the estimated time cost for in-flight IO jobs is less than the predetermined number, the IO job can be sent to the hardware device.

Referring now to operation 610 it illustrates the operational procedure of FIG. 5, wherein the client is a virtual machine. For example, in this embodiment the client can be a virtual machine such as virtual machine 216 or virtual machine 218 of FIG. 2 or FIG. 3. The virtualization service provider 228 can generate a software representation of a hardware device such as storage 208, a NIC 210, and/or a graphics card 234 and provide an interface to the software representation of the hardware device to a partition in the form of a virtual device of a virtual machine. The guest OS 220 for example can write an IO request to the software representation of the hardware device and the request can be stored in a memory location shared between the balancer 226 and the virtual machine 216. The balancer 226 can access the shared memory location and obtain the IO job.

Referring now to operation 612 it illustrates the operational procedure of FIG. 5, wherein the client is a terminal server session. For example, and referring to FIG. 2 or FIG. 3, in an embodiment the client can be a terminal server session such as TS session 240, 242, 244, or 246 or any other application that executes on an operating system such as a database management program, a web sever application, etc. For example, a TS session in embodiment of the present disclosure can send IO jobs to the executive of the guest operating system 220 and these requests can be balanced against other jobs from other TS sessions. In this example IO jobs can be tagged with information that identifies which session they are from and fed into the balancer 226. In this example the balancer 226 can be configured to balance among virtual machines and among applications that execute on the virtual machines such as the terminal server sessions. In this example situations may exist where the terminal server sessions are balanced and the virtual machines are themselves balanced. As is illustrated by FIGS. 2 and 3, the TS sessions are executing on virtual machines however in other embodiments the TS sessions may be executing on an operating system that is executing on the bare hardware.

Continuing with the description of FIG. 6, additionally illustrated is operation 614 that shows receiving an IO job associated with a second client; determining that the second client is associated with information that identifies an amount of time that the hardware device can spend completing job requests from the second client; and sending the IO job request associated with the second client to the hardware device. For example, in an embodiment of the present disclosure the balancer 226 can receive an IO job from a client such as virtual machine 218 and determine that the job request is from a client that has an allocated amount of time on the hardware device. For example, the balancer 226 can access a memory that stores an amount of time associated with the client. In an embodiment if the memory includes, for example, a positive amount of time the IO job can be sent to the hardware device. Additionally or alternatively, the processor 212 can execute instructions indicative of the balancer 226 and determine how long it will take the hardware device to complete the job using techniques similar to those described above and reduce the amount of time allocated to the second client by the estimated amount.

In at least one embodiment the job can comprise a plurality of IO jobs and the balancer 226 can determine how long it will take the hardware device to complete the jobs. In one embodiment all the jobs can be issued even if the estimated amount of time is greater than the allotted amount of time, or in other embodiments a subset of jobs that have an estimated time cost less than or equal to the allotted time can be sent to the hardware device and the remainder can be stored in the balancer queue using techniques described in U.S. patent application Ser. No. 12/242,615 entitled "TEMPORAL BATCHING OF I/O JOBS." In this example if a client sends a lot of requests to the balancer 226 that have a total estimated amount of time greater than how much was allocated to it the client will be allowed to 'burst,' e.g., send a stream to the hardware device until the client runs out of allocated time on the hardware device and then the remaining IO job requests will be queued along with the jobs from other clients that depleted, i.e., used or spent, their allocated amount of time.

Figure 7:
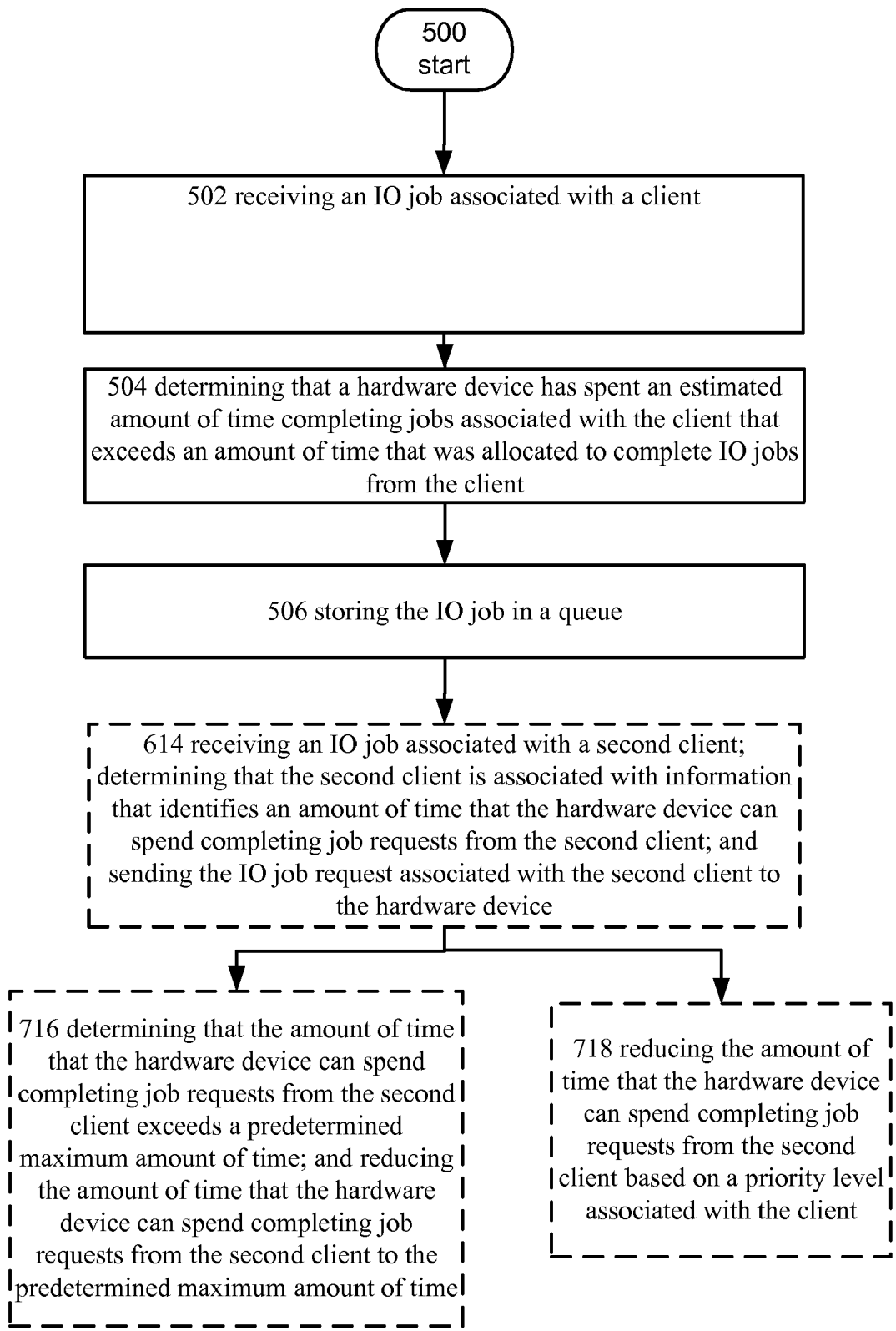
FIG. 7 illustrates an alternative embodiment of the operational procedure 500 of FIG. 6.

Referring now to FIG. 7, it illustrates an alternative embodiment of the operational procedure 500 of FIG. 6 including the additional optional operations 716 and 718. Operation 716 shows determining that the amount of time that the hardware device can spend completing job requests from the second client exceeds a predetermined maximum amount of time; and reducing the amount of time that the hardware device can spend completing job requests from the second client to the predetermined maximum amount of time. For example, in embodiments of the present disclosure the balancer 226 can be set to identify a maximum amount of time that a client can have allocated to it and if the amount of time that the hardware device can spend completing job requests from the client exceeds that limit the balancer 226 can reduce the amount of allocated time to the maximum. For example, in an embodiment the balancer 226 can add time to each client's flow and if a client does not send IO jobs for an entire day their flow could increase to an amount where the client could potentially burst to the hardware device for a long time. In embodiments that include the predetermined maximum limit this behavior is prevented by sacrificing long term balance in order to allow for increased short term performance. That is, by setting a maximum limit individual clients can not burst for a long time which would significantly increase latency experienced by other clients.

In a specific example the second client, e.g., virtual machine 216, may not issue any IO jobs for 5 hours and may have an amount of allocated time equal to an hour. The balancer 226 in this example may be balancing 3 other clients that are issuing IO jobs on a relatively continuous basis and virtual machine 216 may then send an estimated 30 seconds worth of IO jobs to the hardware device. If for example, the balancer 226 was operating without the predetermined maximum amount of time all estimated 30 seconds of IO jobs may be sent to the hardware device. In this example the other 3 clients that were issuing continuous IO jobs will have to wait perhaps 30 seconds before their jobs are serviced. In this situation long term balance was achieved because virtual machine 216 'saved' that time by not sending jobs all the time, however the other 3 clients could be resource starved. In the example where the balancer 226 was operating with the predetermined maximum amount of time the first, for example, the allocated amount of time could be reduced from an hour to 4 seconds. In this example the first 4 seconds worth of IO jobs can be sent to the hardware device and then the 26 seconds worth of IO jobs could be balanced along with the jobs from the other 3 clients. In this example long term fairness is sacrificed for better overall system performance.

Continuing with the description of FIG. 7, operation 718 shows reducing the amount of time that the hardware device can spend completing job requests from the second client based on a priority level associated with the client. In an example embodiment when the IO job or jobs from the second client are sent to the hardware device the amount of time that the balancer 226 estimates the hardware device will need to complete the IO job or jobs can be subtracted from the amount of time that was allocated to service jobs from the second client. In an example the estimated amount of time needed to complete the IO jobs can be modified by a scalar factor indicative of the client's priority prior to being subtracted. For example, in an embodiment each client can be assigned a priority level by an administrator that is indicative of how important the administrator thinks the client is. In this example, clients associated with a higher priority level can have more time on the hardware device than other clients. In a specific example the priority level for a first client can be 1, a second client can be 2 and each client has 10 ms of allocated time on the device. In this specific example the balancer 226 can charge the first client twice as much as the second client. That is, if a 5 ms worth of IO jobs are received by the balancer 226 for client 1, the balancer 226 may reduce the allotted time by 10 ms whereas if the jobs were from client 2 the balancer 226 may have reduced the allocated amount of time by 5 ms.

Figure 8:
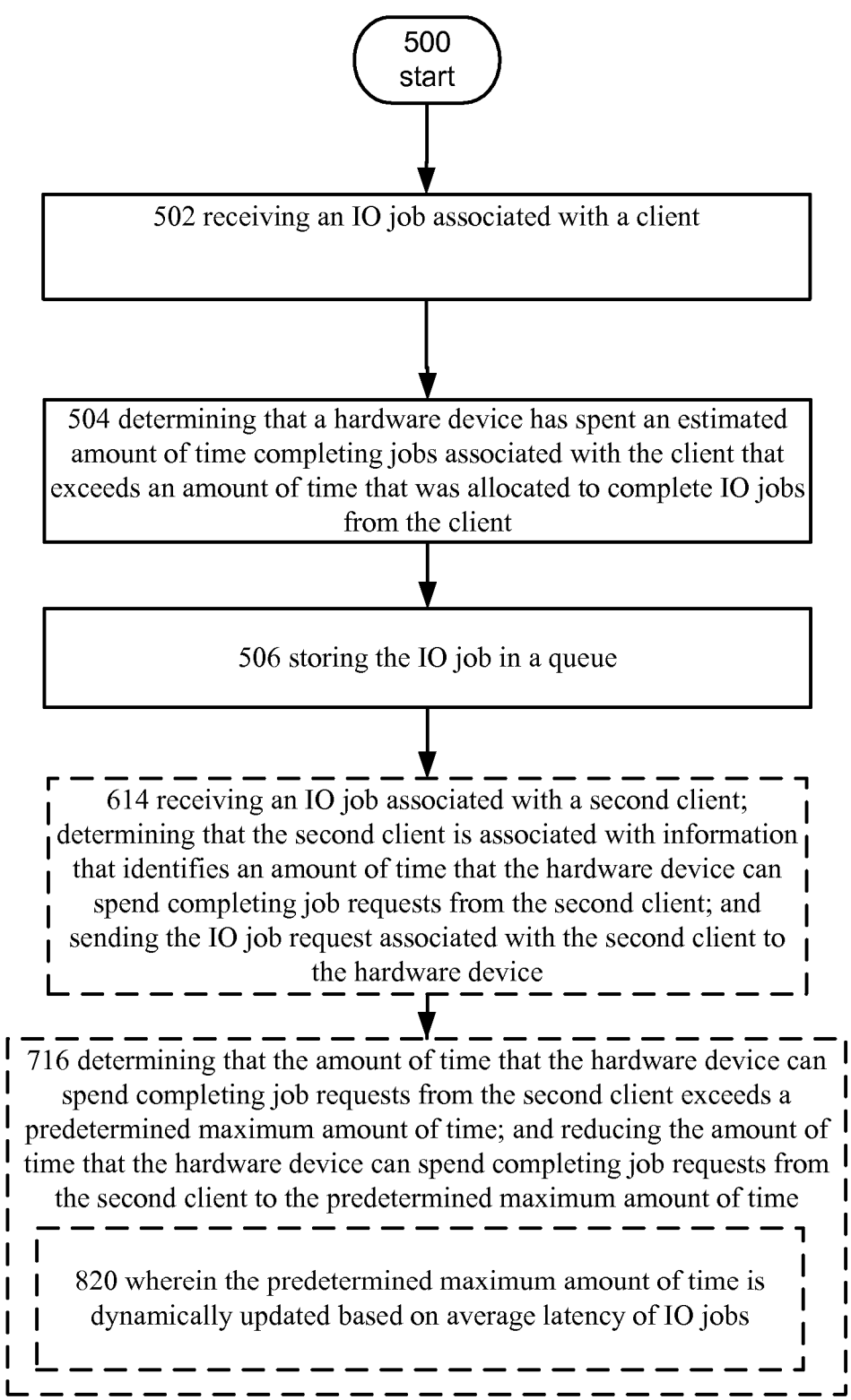
FIG. 8 illustrates an alternative embodiment of the operational procedure 500 of FIG. 7.

Referring now to FIG. 8, it illustrates an alternative embodiment of the operational procedure 500 of FIG. 7 including the additional optional operation 820 that shows the operational procedure of FIG. 5, wherein the predetermined maximum amount of time is dynamically updated based on average latency of IO jobs. For example, in an embodiment of the present disclosure instead of being configured by an administrator, the predetermined maximum amount of time that a client can have on the hardware device can be dynamically updated. In one implementation, the initial predetermined maximum amount of time can be set to a large number and scaled back based on the average latency of IO job completion signals. For example, in the instance that a client is bursting to the hardware device, e.g., sending 10 seconds worth of data to the hardware device, the balancer 226 can be configured to determine the average amount of time it took for each job from the time it was sent from the balancer 226 until a competition signal is received from the hardware and compares that to the average amount of time it took for jobs from other clients that have an allotted amount of time to use the hardware device to be completed. If, for example, the difference is 2 times as much then the predetermined maximum amount of time can be reduced.

Figure 9:
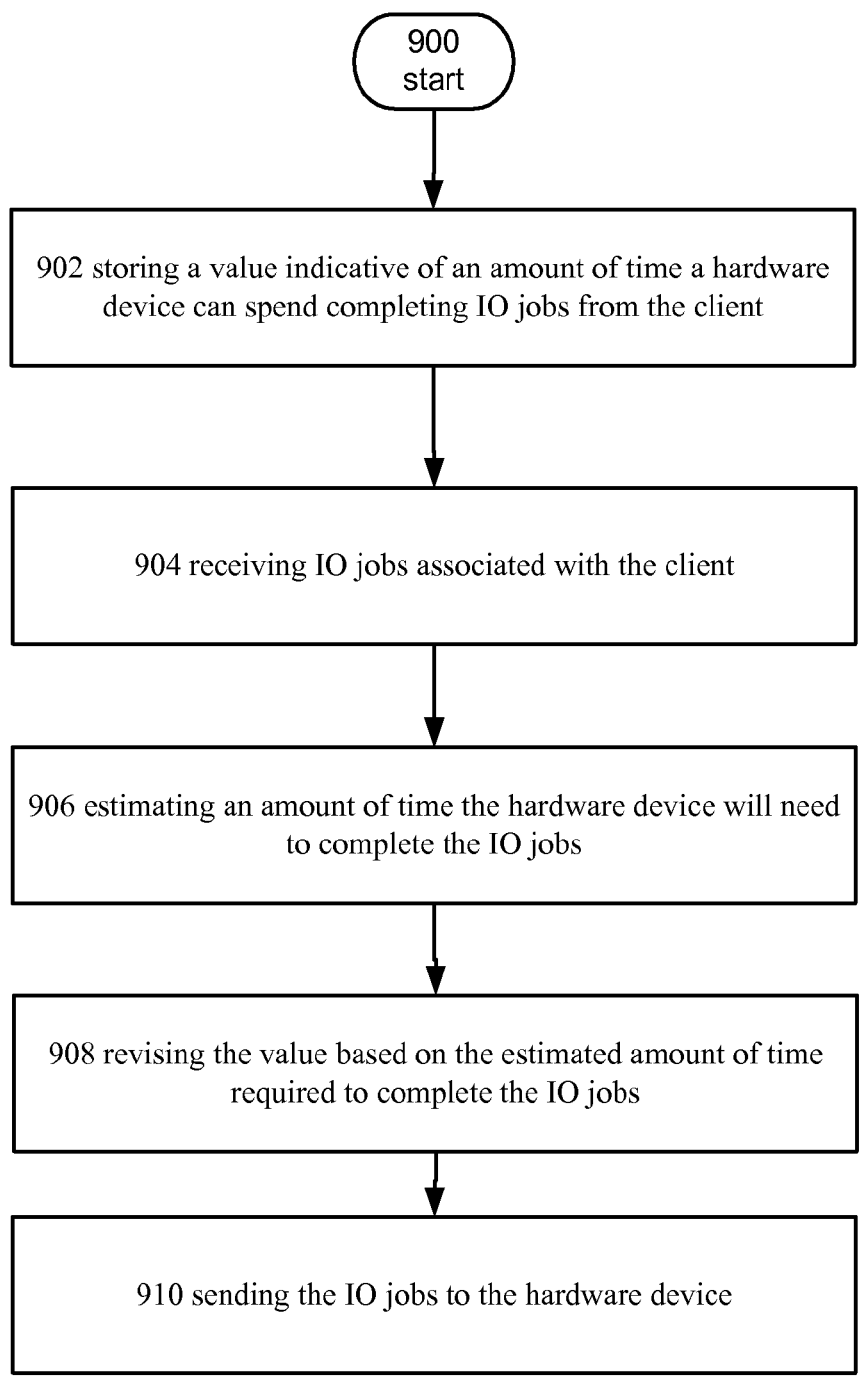
FIG. 9 illustrates an operational procedure for practicing aspects of the present disclosure.

Referring now to FIG. 9, it illustrates an operational procedure for practicing aspects of the present disclosure including operations 900, 902, 904, 906, 908, and 910. Operation 900 begins the operational procedure and operation 902 shows storing a value indicative of an amount of time a hardware device can spend completing IO jobs from the client. For example, a value can be stored in memory such as RAM that can be indicative of the amount of time that a hardware device can spend processing IO requests from a client. For example, in an embodiment the value can be a number of milliseconds. The value in this example can be used to balance hardware usage among at least two clients based on an estimate as to how long the hardware device will need to complete IO jobs.

Continuing with the description of FIG. 9, operation 904 shows receiving IO jobs associated with the client. For example, and in addition to the previous example the balancer 226 can be run, e.g., a processor 212 can execute code indicative of the balancer 226, and IO jobs from a client, e.g., virtual machine 218, can be obtained. For example, the balancer 226 can have a memory location that is shared with virtual machine 218, e.g., a ring buffer or a self overwriting memory location. In this example the balancer 226 can access the shared memory location and receive information that identifies the IO jobs and, for example, a pointer to the data.

Continuing with the description of FIG. 9, operation 906 shows estimating an amount of time the hardware device will need to complete the IO jobs. For example, the balancer 226 can in this example receive the IO job requests and estimate how long it will take to complete the requests. In this example the balancer 226 can estimate how long it will take the hardware device to complete the jobs based on factors such as the operating characteristics of the hardware device, number of bytes in the request, the type of request, e.g., read or write, overhead associated with processing any IO job, whether the request involves a flow switch or is in non-sequential order (in the storage device example), etc. In other example embodiments the estimation can be obtained using techniques described in U.S. application Ser. No. 12/242,621 entitled "HARDWARE THROUGHPUT SATURATION DETECTION." In one embodiment the balancer 226 can be part of the driver for the hardware device. In this example a processor 212 can execute instructions that effectuate the driver and estimate how long it will take the hardware device to complete the jobs that it received, e.g., jobs stored in a shared memory location.

Continuing with the description of FIG. 9, operation 908 shows revising the value based on the estimated amount of time required to complete the IO jobs. For example, after the estimated time it will take to complete the jobs is determined, the value indicative of the amount of time the hardware device can spend working on IO jobs from the client can be revised. In one embodiment, and referring to FIG. 4, the client could be client 1 having a 'positive' flow, e.g., a value that represents that the client has available time on the hardware device. The value in this example can represent a time value such as 15 ms. In this example the value can be revised, e.g., reduced, by an amount based on the estimated time that it will take to finish the IO jobs. For example, if the processor 212 executes the balancer code and determines that the estimated amount of time it will take for the hardware device to complete the jobs is 10 ms then the positive time value associated with client 1 can be reduced by 10 ms. If for example the estimated amount was 20 ms, in one embodiment the processor 212 can execute the balancer code and reduce the value to 0 and store the IO jobs that make up the remaining 5 ms in the queue. In an alternative implementation the balancer 226 could issue the entire 20 ms of IO jobs to the hardware device and revise the value to make it 'negative,' e.g., by assigning a number to the value that represents that the client has overused its allotted time on the hardware device.

Continuing with the description of FIG. 9, operation 910 shows sending the IO jobs to the hardware device. For example, and in addition to the previous example, the IO jobs can be sent to the hardware device. In one embodiment this can include sending all the jobs that were received in operation 904, however in other embodiments this can include sending a portion of the received IO jobs such as is described in U.S. patent application Ser. No. 12/242,615 entitled "TEMPORAL BATCHING OF I/O JOBS." For example, and described above, in one embodiment if the value is reduced to 0 then the remaining jobs can be stored in the balancer queue. In an embodiment where the balancer 226 is located in the root, sending the IO jobs to the hardware device can include, but is not limited to sending, by the balancer 226, the IO jobs to the driver associated with the hardware device.

Figure 10:
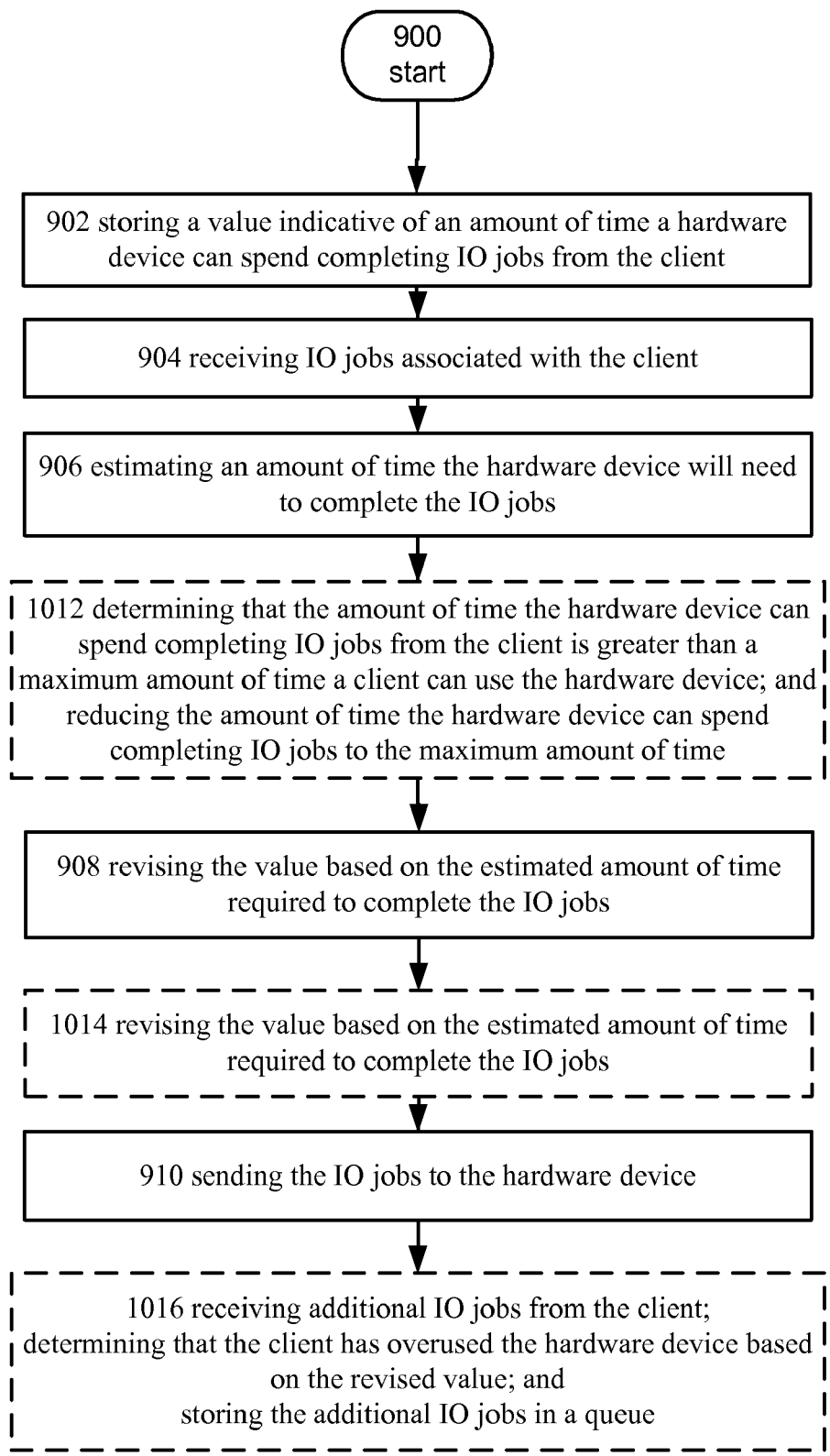
FIG. 10 illustrates an alternative embodiment of the operational procedure 900 of FIG. 9.

Referring now to FIG. 10, it illustrates an alternative embodiment of the operational procedure 900 of FIG. 9 including the operations 1012, 1014, and 1016. Referring to operation 1012, it shows determining that the amount of time the hardware device can spend completing IO jobs from the client is greater than a maximum amount of time a client can use the hardware device; and reducing the amount of time the hardware device can spend completing IO jobs to the maximum amount of time. For example, in an embodiment the balancer 226 can be executed by a logical processor such as processor 212 and the processor 212 can determine that the amount of hardware processing time available to the client is greater than a maximum amount of time that can be available to the client and reduce the amount available to the maximum amount. For example, in embodiments of the present disclosure resource starvation can be reduced or avoided at the sacrifice of long term fairness. Resource starvation generally refers to the instance where the client can not access the hardware and in turn can not make acceptable process. In the instance where the maximum amount of time available to the client is unbounded then a client could potentially obtain an amount of time on the hardware device that will take a very long time to complete. If the unbound client has a significant amount of IO jobs the client could burst to the hardware device for a long time. In embodiments that include a maximum amount of time this behavior is prevented thereby sacrificing long term fairness to prevent a situation where one client's IO jobs could use the hardware device for a long time and IO jobs from other clients would have to wait.

Continuing with the description of FIG. 10, it illustrates operation 1014 that shows revising the value based a priority level for the client. For example, in an embodiment the value can be revised based on the priority level associated with the client. In an embodiment an administrator can assign priority levels to different clients and the balancer 226 can be used to ensure that the hardware device received IO jobs in a way that honors the client's priority. In one implementation the value can be revised by increasing the amount of time a hardware device can spend completing IO jobs from the client by an amount in proportion to its priority. In this example the balancer 226 can add time to a given client's available amount based on its priority level, that is, a higher priority client can be given more time. In another embodiment the value can be revised by, for example, reducing, the value at a rate based on the client's priority. For example, when the value is revised based on the estimated amount of time it will take to complete IO jobs, the estimated amount can be modified by a scalar factor indicative of the client's priority. Instructions that effectuate the revision can be executed using different techniques. For example, in an embodiment the revision instructions can be executed based on the passage of time, e.g., a timer could expire and the balancer 226 can add to 'clients' values, based on completion signals. That is, in an implementation time can be added to each client's flow based on the passage of time. In another implementation, such as example embodiments described above, the receipt of a completion signal can trigger the execution of the instructions that effectuate the revision.

Continuing with the description of FIG. 10, operation 1016 shows receiving additional IO jobs from the client; determining that the client has overused the hardware device based on the revised value; and storing the additional IO jobs in a queue. In an example embodiment the balancer instructions can be run by the processor 212 and the balancer 226 can receive additional instructions from the client. The processor 212 can execute the balancer 226 and a determination can be made that the amount of time the hardware device can spend completing IO jobs from the client has been used up, e.g., the flow is negative such as the flows associated with clients 3 and 4. In this example the additional jobs can be stored in a queue associated with the balancer 226. In a specific example the client may have had a positive value indicative of 10 ms and the client may have sent 20 ms worth of IO jobs to the balancer 226. The balancer 226 in this example can issue the 20 ms worth of IO jobs to the hardware device and store a value in memory indicative of the fact that the client overused the hardware device by 10 ms. Subsequently the client may send another 20 ms with of IO jobs to the balancer 226. The balancer 226 in this example can determine that the client overused the hardware device by 10 ms and the balancer 226 can store the 20 ms worth of IO jobs in a queue.

Figure 11:
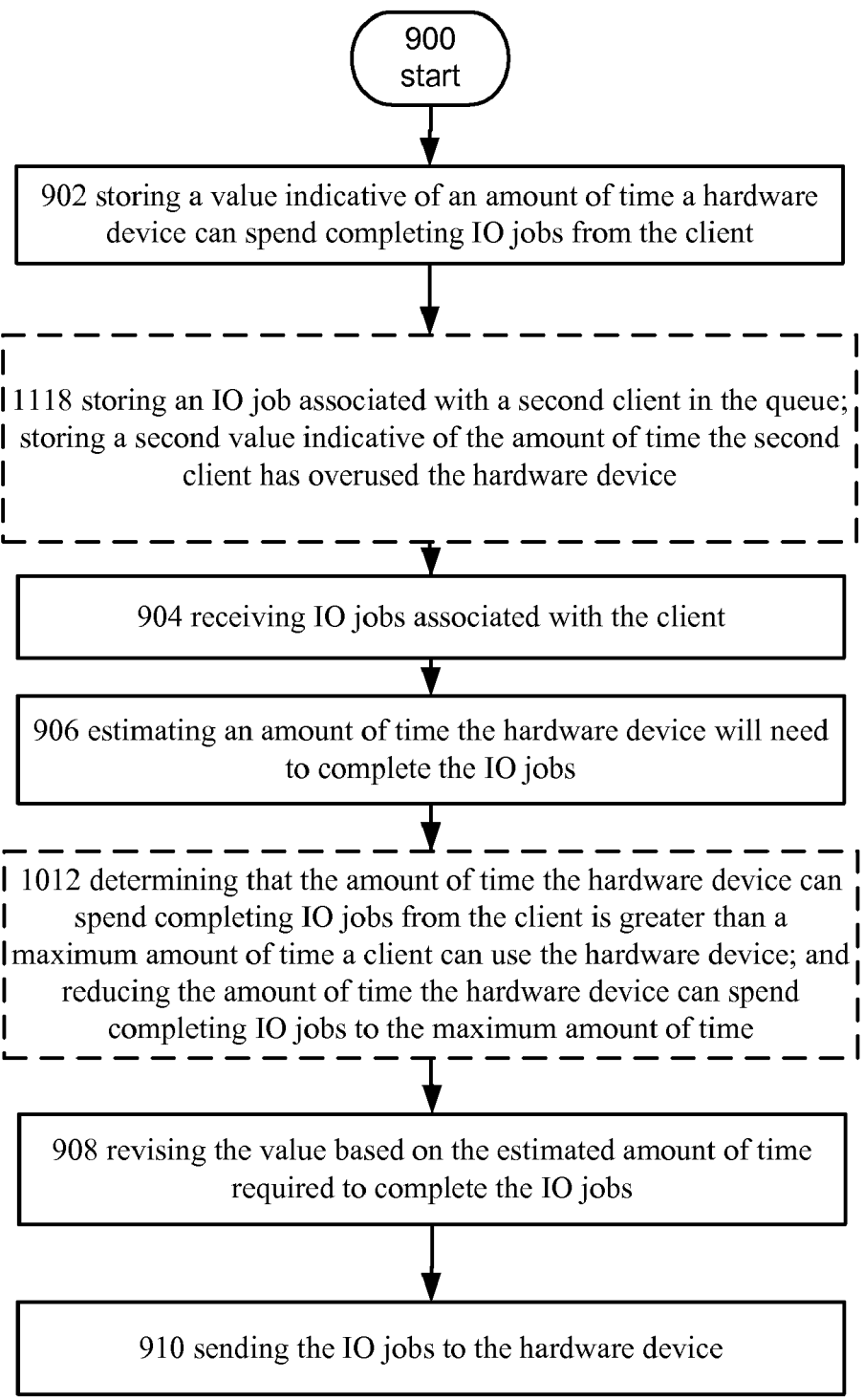
FIG. 11 illustrates an alternative embodiment of the operational procedure 900 of FIG. 10.

Referring now to FIG. 11, it illustrates an alternative embodiment of the operational procedure 900 of FIG. 10. FIG. 10 shows optional operation 1118 that depicts storing an IO job associated with a second client in the queue; and storing a second value indicative of the amount of time the second client has overused the hardware device. In this example the balancer 226 can maintain multiple values for multiple clients and in this example the values can indicate that the client overused the hardware device. For example, in an embodiment the balancer 226 can store values for clients such as virtual machines and values for applications that execute on the virtual machines together in a single queue. That is, for an application the balancer 226 will be balancing between applications executing on the virtual machines and balancing between virtual machines.

Figure 12:
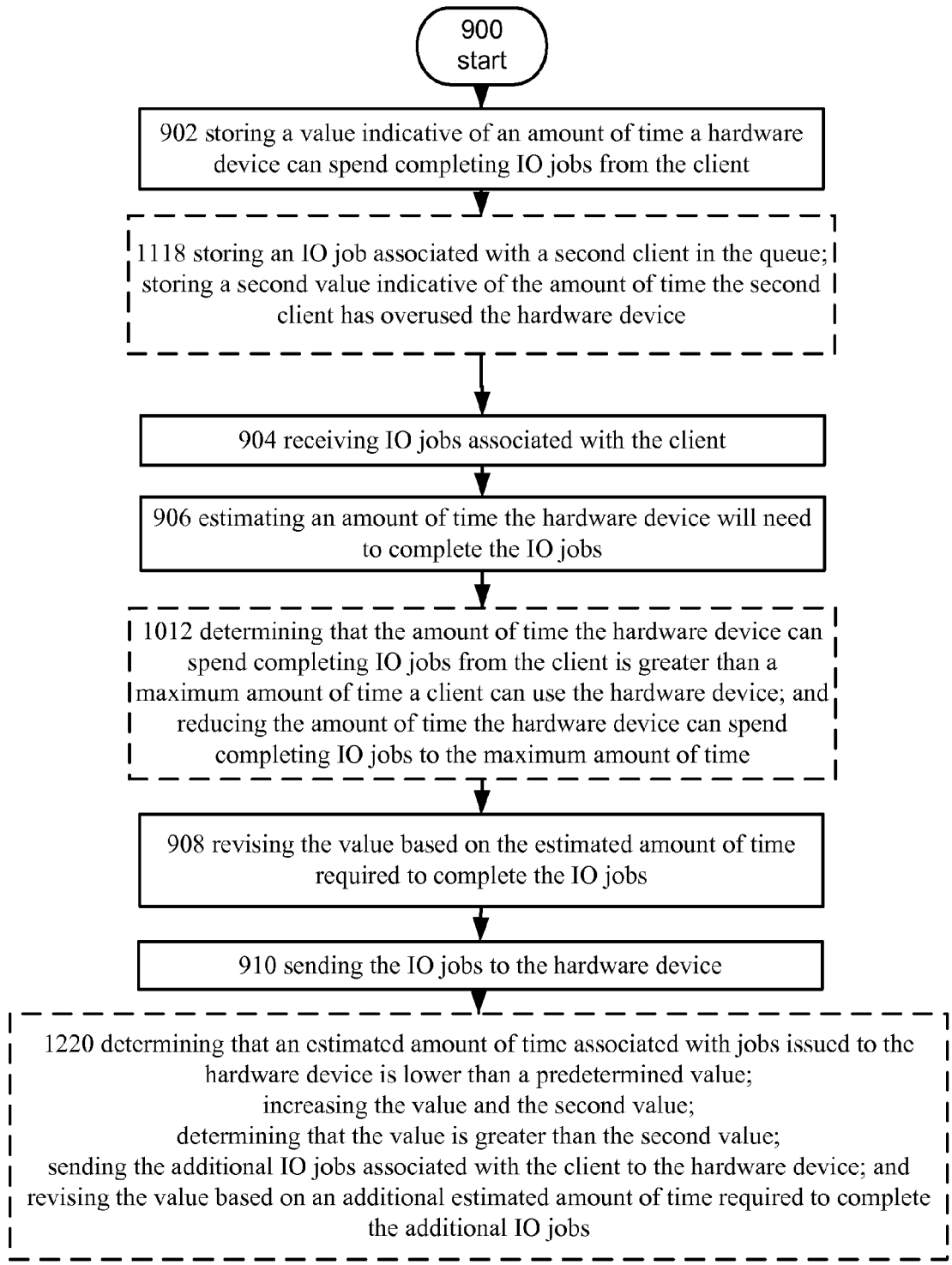
FIG. 12 illustrates an alternative embodiment of the operational procedure 900 of FIG. 11.

Referring now to FIG. 12, it illustrates an alternative embodiment of the operational procedure 900 of FIG. 11. FIG. 12 shows optional operation 1220 that depicts determining that an estimated amount of time associated with jobs issued to the hardware device is lower than a predetermined value; increasing the value and the second value; determining that the value is greater than the second value; sending the additional IO jobs associated with the client to the hardware device; and revising the value based on an additional estimated amount of time required to complete the additional IO jobs. For example, the balancer 226 in this example can determine the estimated amount of time that it will take for the hardware device to complete the jobs that are currently 'in flight' to the hardware is lower than a predetermined value. For example, a value indicative of hardware saturation and the balancer 226 can increase the values for the clients, e.g., each value can be increased the same amount or increased by different amounts based on, for example, the priority of the client. In either case the balancer 226 can determine that the value associated with the client is greater than the value associated with the second client; issue the client's IO jobs; and revise the value based on the estimated time cost for the additional IO jobs.

Figure 13:
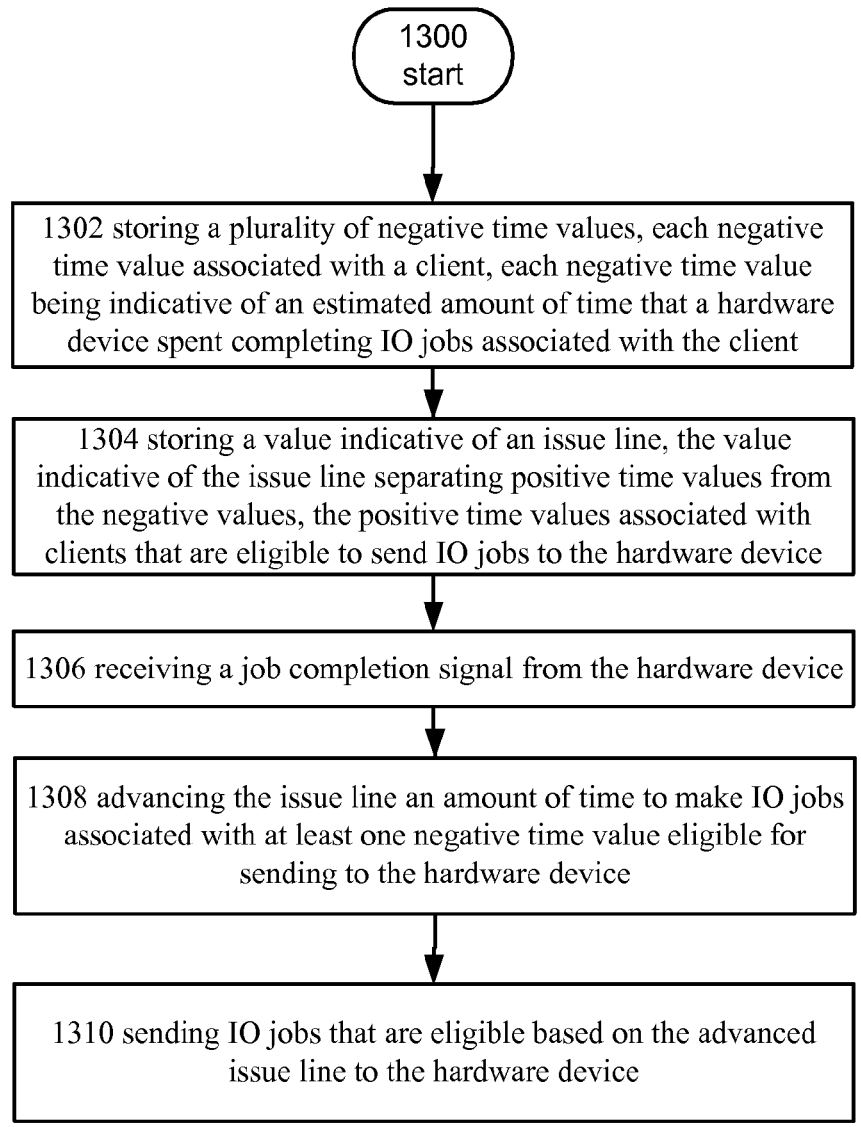
FIG. 13 illustrates an operational procedure for balancing IO requests.

Referring now to FIG. 13 it illustrates an operational procedure for balancing IO requests including operations 1300, 1302, 1304, 1306, 1308, and 1310. Operation 1300 begins the operational procedure and operation 1302 shows storing a plurality of negative time values, each negative time value associated with a client, each negative time value being indicative of an estimated amount of time that a hardware device spent completing IO jobs associated with the client. For example, and referring to FIG. 4 for illustration purposes, in an embodiment a plurality of native time values can be stored in memory accessible to a balancer 226 such as RAM or a cache built into the hardware device. In this example, each negative time value can be indicative of an estimated amount of time that the hardware device spent completing IO jobs from the clients that was over the amount of time that was allocated to the clients. Similar to that described above, the balancer 226 can estimate how long it will take the hardware device to complete the jobs based on factors such as the operating characteristics of the hardware device, number of bytes in the request, the type of request, e.g., read or write, overhead associated with processing any request, whether the request involves a flow switch or is in non-sequential order (in the storage device example), etc. In other example embodiments the estimation can be obtained using techniques described in U.S. application Ser. No. 12/242,621 entitled "HARDWARE THROUGHPUT SATURATION DETECTION." In a specific example, and referring to FIG. 4, values that indicate that client 3 and client 4 have overused the hardware device can be stored in memory. In this example, the values can identify how much estimated time each client overused the device.

Continuing with the description of FIG. 13 operation 1304 shows storing a value indicative of an issue line, the value indicative of the issue line separating positive time values from the negative values, the positive time values associated with clients that are eligible to send IO jobs to the hardware device. For example, and referring to FIG. 4, the issue line can be indicative of the boundary between the clients that can use the hardware device and the clients that have overused the hardware device. In this example the negative value many not necessarily be a negative number and the balancer 226 can determine whether the value is indicative of a client having available time or indicative of whether the client overused the hardware device based on the value's relationship to the issue line. In one embodiment client flow values less than the issue line value can be considered positive whereas values greater than the issue line can be considered negative. More specifically, the issue line value may be 50 ms, client 6 may have a value of 0 ms, client 5 may have a value of 5 ms, client 4 may have a value of 60 ms, client 3 may have a value of 80 ms, client 2 may have a value of 25 ms and client 1 may have a value of 40 ms. The balancer 226 can be configured to identify which clients are associated with positive values and which clients are associated with negative values by subtracting the client's value from the issue line value.

Continuing with the description of FIG. 13 operation 1306 shows receiving a job completion signal from the hardware device. For example, in an embodiment a IO job completion signal can be received from the hardware device, e.g., a signal that indicates a job or jobs is or are finished, and the balancer 226 can be run, e.g., the processor 212 can execute the instructions indicative of the balancer 226. The balancer 226 in this example can determine the estimated amount of time that it will take for the hardware device to complete the jobs that are still currently 'in flight' to the hardware and determine whether the total is less than a target latency value, e.g., a value that reflects that the hardware device is saturated with IO jobs. In this embodiment however the target latency value may not be obtainable, e.g., when there are not enough IO jobs to saturate the hardware device. In this instance a minimum time cost value that reflects the minimum amount of work that needs to be in flight to the hardware in order to justify the additional cost of balancing and a value equal to the target latency value multiplied by a scalar such as 0.8 can be calculated. For example, balancing injects additional latency into each IO job from the perspective of the client, e.g., by running the balancer 226 there is a chance that a given IO job may have a slightly higher latency, however this additional latency is offset by the benefits that balancing introduces when the time cost of the IO jobs in flight is higher than the minimum time cost value. In this example, when the target latency value can not be obtained, the actual obtainable value can be determined and for example 80% of that value can be set as the target latency value in the balancer 226. In this example the balancer 226 can be configured to determine whether the time cost of IO jobs in flight to the hardware is less than the target latency value multiplied by the scalar.

Continuing with the description of FIG. 13 operation 1308 shows advancing the issue line an amount of time to make IO jobs associated with at least one negative time value eligible for sending to the hardware device. In this example, the balancer 226 can determine that the hardware device is not saturated for example, and advance the issue line an amount that will make at least one negative value a positive value. For example, and referring to FIG. 4, the balancer 226 in this example may determine that client 4 is the least negative, e.g., the issue line—the negative value for client 4 is less negative than the issue line—the negative value for client 3 and determine to increment the issue line by at least 30 ms so that the value for client 4 is equal to 0. In this example embodiment the balancer 226 can be configured to send IO jobs associated with values equal to 0 when the issue line is moved. In this example embodiment by incrementing the issue line the positive time value flows will additionally be increased and the negative time values will become less negative. In this example the clients associated with positive values can be given additional time on the hardware device to preserve fairness between all clients. That is, a quiet client, one that has a positive value and is not using the hardware device will be given an amount of time that can be spent later by, for example, bursting. In addition, in at least one embodiment the issue line can be advanced an additional amount using techniques described in U.S. patent application Ser. No. 12/242, 615 entitled "TEMPORAL BATCHING OF I/O JOBS."

Continuing with the description of FIG. 13 operation 1310 shows sending IO jobs that are eligible based on the advanced issue line to the hardware device. For example, and in addition to the previous example, the IO jobs that are newly eligible, e.g., IO jobs associated with client 4 can be sent to the hardware device. In one embodiment this can include sending all the jobs that are pending for client 4 or a single IO job for client 4. In another embodiment an amount can be selected using techniques described in U.S. patent application Ser. No. 12/242,615 entitled "TEMPORAL BATCHING OF I/O JOBS." Referring to FIG. 4, the issue line may have been moved to the right to the issue point of the flow associated with client 4, that is, the time value of the issue line can be increased to 60 ms. In this example the balancer 226 can be configured to issue all the pending IO jobs associated with flows that have a value of 0 or greater. In the same, or other embodiments the balancer 226 can be configured to increase the issue line an amount of time equal to, for example, the latency target value multiplied by a scalar such as 0.2 (for example, 120 ms*0.2=24.) In this example client 4 would have a positive value, e.g., the value would be 4 ms (64 ms−60 ms) and the balancer 226 can be configured to issue any IO jobs that are associated with non-negative time values. As one of skill in the art can appreciate, the multiplier 0.2 and target latency value are exemplary and other scalars/target latency values can be used without departing from the spirit of the subject matter described herein.

Figure 14:
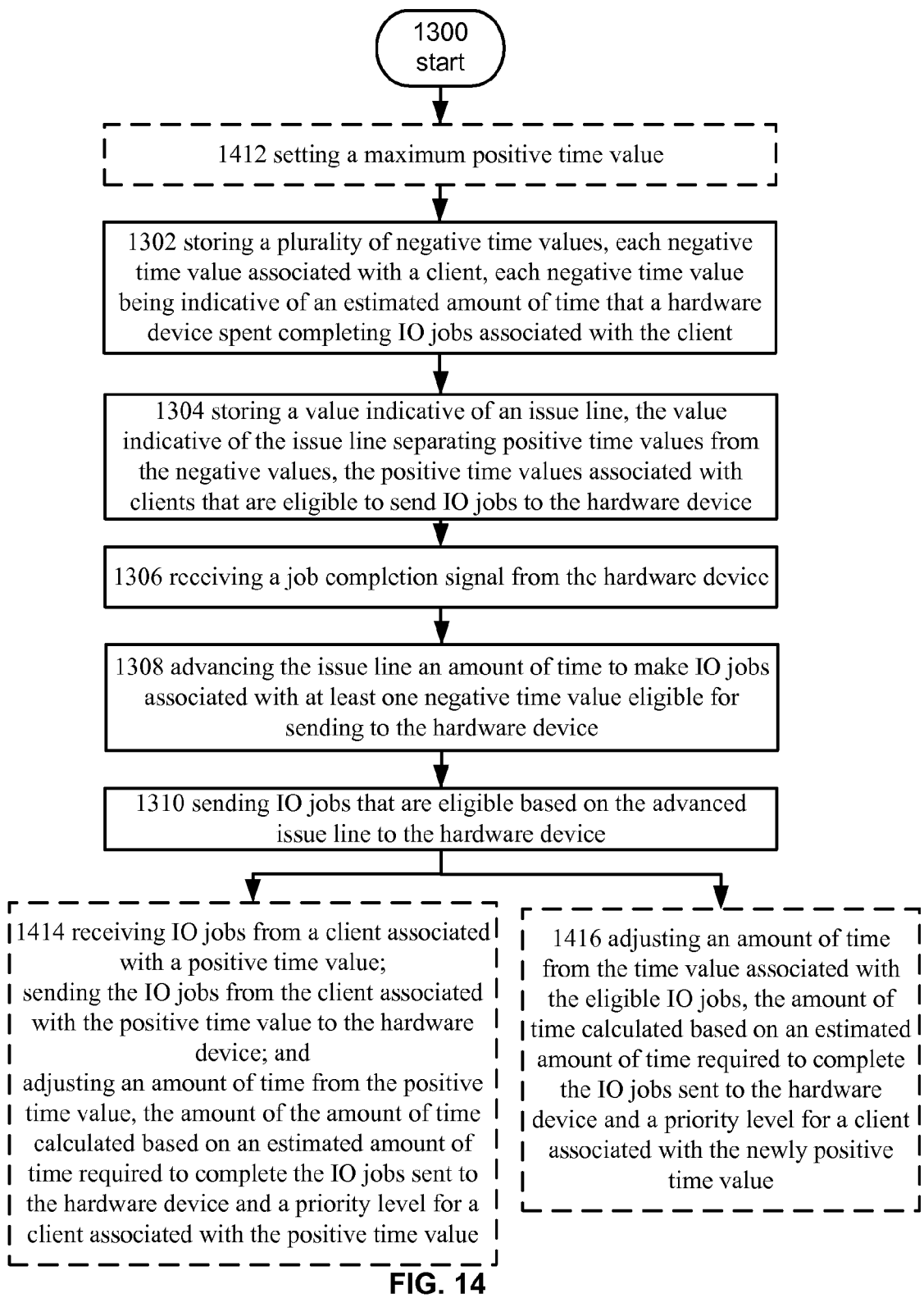
FIG. 14 shows an alternative embodiment of the operational procedure 1300 of FIG. 13.

Referring now to FIG. 14, it shows an alternative embodiment of the operational procedure 1300 of FIG. 13 including the operations 1412, 1414, and 1416. Referring to operation 1412, it shows setting a maximum positive time value. For example, and referring to FIG. 4, in an embodiment of the present disclosure the balancer 226 can store a value indicative of the maximum amount of positive time that a given flow can obtain such as 4 seconds or 45 ms in the example depicted by FIG. 4 (50 ms−5 ms=45 ms, or put another way the issue line minus the value of client 5, which is equal to 45 ms.) The maximum positive time value can be used to set how long an individual client can potentially monopolize the hardware device. In some instances it is more efficient for the hardware device to process a large amount of IO jobs from one client, e.g., in a storage example the client may be a virtual machine and having the hardware device process a large amount of IO jobs from the virtual machine can allow for streaming. However this efficiency comes at the cost of the other clients that will be resource starved while the virtual machine is monopolizing the hardware device. Thus, the maximum positive time value can be set by an administrator to allow a client to monopolize the hardware device for a limited amount of time before the client's flow is used up and then if there are other IO jobs remaining those jobs can be balanced along with IO jobs from other clients. If an administrator wants to allow clients to 'save up' for larger bursts and better long term balance between smooth and bursty clients, they could set a large maximum positive time value, or if the administrator wants to disallow large bursts and potentially penalize bursty workloads, they could set a small positive time value. A maximum positive time value of zero would result in effectively no bursts allowed, where a client would not be able to save up time—in this case a client that is issuing IO after being quiet for a while would be on equal footing with a client that had been continuously issuing IO. Bursty clients would get less overall IO done because they would not be allowed to make up for lost time.

Continuing with the description of FIG. 14, operation 1414 shows receiving IO jobs from a client associated with a positive time value; sending the IO jobs from the client associated with the positive time value to the hardware device; and adjusting an amount of time from the positive time value, the amount of the amount of time calculated based on an estimated amount of time required to complete the IO jobs sent to the hardware device and a priority level for a client associated with the positive time value. For example the balancer 226 can receive an IO job from a client such as client 2 of FIG. 4 and determine that the client has a positive time value. The IO jobs can be sent and the positive value can be adjusted by an amount that reflects the estimated time cost for the IO jobs sent to the hardware device modified by the priority of the client. For example, the balancer 226 can access a memory that stores a value equal to 25 ms (issue line value 50 ms minus positive time value of client 2 being 25 ms.)

Generally, in an un-weighted example client 2 would be able to send 25 ms worth of IO jobs to the hardware device before their jobs are stored in the queue, however in this example embodiment the positive time value for client 2 can be reduced at a rate equal to the estimated time cost of the IO jobs modified by a scalar value. For example, in one embodiment the positive time value can be reduced at a modified rate based on the priority of the client. Clients with higher priority have their positive time reduced at slower rates than clients with lower priority. For example, in an embodiment each client can be assigned a weight and balancer 226 can subtract an amount from the positive time value using the following equation scaled_time_cost=IO job time cost*(Sum(weight of all flows)/weight of flow associated client.) In a specific example, and referring to FIG. 4, each client can have an assigned weight value, e.g., clients 1 and 3-6 can be assigned weights of 1 and client 2 can be assigned a weight of 5. The balancer 226 can send 1 ms worth of IO jobs to the hardware device from client 2 and subtract 2 ms from the positive time value associated with client 2 by using the above described equation. In this example a weight value of 5 for client 2 out of a total sum of weights 10 allows client 2 to use half of the available time on the hardware device. By using the equation above an implementer can add time to each flow, even if the flows have different weights, by changing the issue line. In this example embodiment the balancer 226 can maintain balance for all flows on one timeline. As one of skill in the art can appreciate, the equation used above is exemplary and other equations can be used to reduce a value associate with a client's flow without departing from the spirit of the subject matter described herein.

Continuing with the description of FIG. 14, operation 1416 shows adjusting an amount of time from the time value associated with the eligible IO jobs, the amount of time calculated based on an estimated amount of time required to complete the IO jobs sent to the hardware device and a priority level for a client associated with the newly positive time value. For example, and referring to example operation 1310, the balancer 226 can move the issue line ahead 24 ms and issue IO jobs associated with any positive flows, e.g., flow 4 continuing the example. In this embodiment the balancer 226 can adjust the client's flow at a rate equal to the estimated time cost of the IO jobs modified based on the priority of the client using an equation similar to that described above with respect to operation 1414.

Figure 15:
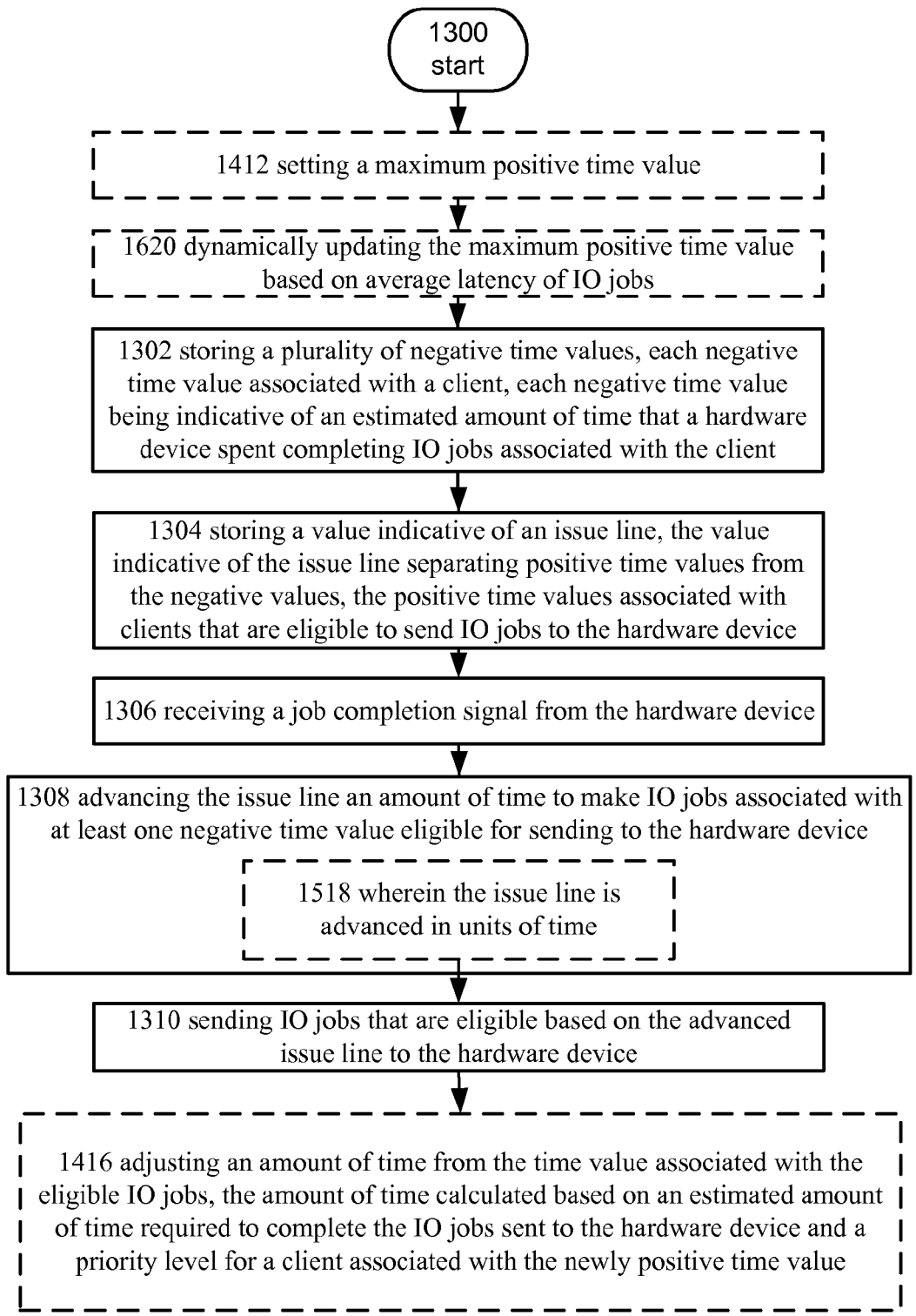
FIG. 15 shows an alternative embodiment of the operational procedure 1300 of FIG. 14.

Referring now to FIG. 15, it shows an alternative embodiment of the operational procedure 1300 of FIG. 14 including optional operation 1518 that shows wherein the issue line is advanced in units of time. For example, the issue line in this embodiment can be advanced in units of time, for example, in milliseconds. In this example, the time values for each flow may also be stored in milliseconds, however they are reduced by weighted amounts using the equations described above. By using the equation above an implementer can add time to each flow, even if the flows have different weights, by changing the issue line. In this example embodiment the balancer 226 can maintain balance for all flows on one timeline and add time to all flows by changing one number. This can reduce the CPU cost associated with executing balancer code. As one of skill in the art can appreciate, the equation used above is exemplary and other equations can be used to reduce a client's flow without departing from the spirit of the subject matter described herein.

An alternative embodiment of the operational procedure 1300 of FIG. 15 may include optional operation 1620 that shows dynamically updating the maximum positive time value based on average latency of IO jobs. For example, in an embodiment of the present disclosure instead of being configured by an administrator, the predetermined maximum amount of time that a client can save up for later use in issuing IO jobs to the hardware device can be dynamically updated. In one implementation, the initial predetermined maximum amount of time can be set to a large number and scaled back based on the average latency of IO job completion signals. For example, in the instance that a client is bursting to the hardware device, e.g., sending 10 seconds worth of data to the hardware device the balancer 226 can be configured to determine the average amount of time it took for each job from the time it was sent from the balancer 226 until a competition signal is received from the hardware and compares that to the average amount of time it took for jobs from other clients to complete calculated from the time the jobs were stored in the queue until the time they were completed. If, for example, the different is 10 times as great then the predetermined maximum amount of time can be reduced. In an alternative embodiment the average amount of time it took for each job for the busting client to be completed can be compared to the average amount of time it took for each job from a client that has an allocated amount of time but was not at the predetermined maximum. If the average latency is a factor of, for example, 2 the predetermined maximum amount of time can be reduced.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for balancing hardware usage, the method comprising:

receiving an IO job associated with a client;

estimating an amount of time a storage device will take to complete IO jobs associated with the client;

determining that the estimated amount of time the storage device will take to complete IO jobs associated with the client exceeds an amount of time that was allocated to complete IO jobs from the client; and storing the IO job in a queue receiving an IO job associated with a second client;

determining that the second client is associated with information that identifies an amount of time that the storage device can spend completing IO job requests from the second client;

sending the IO job request associated with the second client to the storage device;

determining that the amount of time that the storage device can spend completing IO job requests from the second client exceeds a predetermined maximum amount of time; and reducing the amount of time that the storage device can spend completing IO job requests from the second client to the predetermined maximum amount of time.

2. The method of claim 1, further comprising:

receiving an IO job completion signal from the storage device;

determining that estimated completion times for IO jobs pending in the storage device total to a completion time value that is lower than a predetermined value; and sending the IO job to the storage device.

3. The method of claim 1, wherein the client is a virtual machine.

4. The method of claim 1, wherein the client is a terminal server session.

5. The method of claim 1, further comprising:

reducing the amount of time that the storage device can spend completing IO job requests from the second client based on a priority level associated with the client.

6. The method of claim 1, wherein the predetermined maximum amount of time is dynamically updated based on average latency of IO jobs.

7. A computer system comprising:

a processor;

a storage device; and a memory in communication with at least the processor when powered, the memory including instructions stored thereon that upon execution by the processor cause the processor to:

store a value indicative of an amount of time the storage device can spend completing IO jobs from a client;

receive IO jobs associated with the client;

estimate an amount of time the storage device will need to complete the IO jobs;

revise the value based on the estimated amount of time required to complete the IO jobs; and send the IO jobs to the storage device.

8. The computer system of claim 7, wherein the memory further comprises instructions that upon execution cause the processor to:

determine that the amount of time the storage device can spend completing IO jobs from the client is greater than a maximum amount of time a client can use the storage device; and reduce the amount of time the storage device can spend completing IO jobs to the maximum amount of time.

9. The computer system of claim 7, wherein the memory further comprises instructions that upon execution cause the processor to:

revise the value based a priority level for the client.

10. The computer system of claim 7, wherein the memory further comprises instructions that upon execution cause the processor to:

receive additional IO jobs from the client;

determine that the client has overused the storage device based on the revised value; and store the additional IO jobs in a queue.

11. The computer system of claim 8, wherein the memory further comprises instructions that upon execution cause the processor to:

store an IO job associated with a second client in the queue; and store a second value indicative of the amount of time the second client has overused the storage device.

12. The computer system of claim 11, wherein the memory further comprises instructions that upon execution cause the processor to:

determine that an estimated amount of time associated with IO jobs issued to the storage device is lower than a predetermined value;

increase the value and the second value;

determine that the value is greater than the second value;

send the additional IO jobs associated with the client to the storage device; and revise the value based on an additional estimated amount of time required to complete the additional IO jobs.

13. A computer readable medium excluding signals per se including processor executable instructions for balancing IO requests, the computer readable storage medium comprising instructions that upon execution by a processor cause the processor to:

store a plurality of negative time values, each negative time value associated with a client, each negative time value being indicative of an estimated amount of time that a storage device spent completing IO jobs associated with the client;

store a value indicative of an issue line, the value indicative of the issue line separating positive time values from the negative values, the positive time values associated with clients that are eligible to send IO jobs to the storage device;

receive a IO job completion signal from the storage device;

advance the issue line an amount of time to make IO jobs associated with at least one negative time value eligible for sending to the storage device; and send IO jobs that are eligible based on the advanced issue line to the storage device; and reduce an amount of time from the time value associated with the eligible IO jobs, the amount of time calculated based on an estimated amount of time required to complete the IO jobs sent to the storage device and a priority level for a client associated with the newly positive time value.

14. The computer readable storage medium of claim 13, wherein the computer readable storage medium further comprises instructions that upon execution by the processor cause the processor to:

set a maximum positive time value.

15. The computer readable storage medium of claim 13, wherein the computer readable storage medium further comprises instructions that upon execution by the processor cause the processor to:

receive IO jobs from a client associated with a positive time value;

send the IO jobs from the client associated with the positive time value to the storage device; and adjust an amount of time from the positive time value, the amount of time calculated based on an estimated amount of time required to complete the IO jobs sent to the storage device and a priority level for a client associated with the positive time value.

16. The computer readable storage medium of claim 13, wherein the computer readable storage medium further comprises instructions that upon execution by the processor cause the processor to:

adjust an amount of time from the time value associated with the eligible IO jobs, the amount of time calculated based on an estimated amount of time required to complete the IO jobs sent to the storage device and a priority level for a client associated with the newly positive time value.

17. The computer readable storage medium of claim 16, wherein the issue line is advanced in units of time.

18. The computer readable storage medium of claim 17, wherein the computer readable storage medium further comprises instructions that upon execution by the processor cause the processor to:

update the maximum positive time value based on average latency of IO jobs.

\* \* \* \* \*